(12) United States Patent
Yuzawa

(10) Patent No.: US 7,952,801 B2
(45) Date of Patent: May 31, 2011

(54) SCREEN

(75) Inventor: Fumio Yuzawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 62 days.

(21) Appl. No.: 12/482,751

(22) Filed: Jun. 11, 2009

(65) Prior Publication Data

US 2010/0007950 A1      Jan. 14, 2010

(30) Foreign Application Priority Data

Jul. 9, 2008   (JP) ................................. 2008-178724

(51) Int. Cl.
    *G03B 21/56*     (2006.01)
(52) U.S. Cl. ....................................... 359/443; 359/461
(58) Field of Classification Search .................. 359/443, 359/461; 160/238
    See application file for complete search history.

(56) References Cited

U.S. PATENT DOCUMENTS

| | | | | |
|---|---|---|---|---|
| 6,249,377 B1 * | 6/2001 | Takamoto et al. | ............ | 359/461 |
| 7,180,665 B2 * | 2/2007 | Daniel et al. | .................. | 359/461 |
| 7,623,290 B2 * | 11/2009 | Liang et al. | .................... | 359/443 |
| 2007/0121088 A1 | 5/2007 | Liang et al. | | |
| 2007/0121206 A1 | 5/2007 | Liang et al. | | |
| 2007/0121209 A1 | 5/2007 | Liang et al. | | |
| 2009/0067045 A1 * | 3/2009 | Yoshino et al. | ............... | 359/461 |

FOREIGN PATENT DOCUMENTS

JP         2007-219279        8/2007

* cited by examiner

*Primary Examiner* — Christopher Mahoney
(74) *Attorney, Agent, or Firm* — AdvantEdge Law Group, LLC

(57) ABSTRACT

A screen includes: a flexible screen body on which image light is projected; a fixed column arranged in a central portion; an arm sliding unit configured to pivotably support the second arm member of the first pantograph mechanism and the second arm member of the second pantograph mechanism with respect to the fixed column so as to be slidable in the vertical direction, in which the first pantograph mechanism and the second pantograph mechanism are expanded and contracted to move the first supporting unit and the second supporting unit toward and away from each other by a sliding movement of the arm sliding unit, and an urging member configured to urge the first supporting unit and the second supporting unit to move away from each other is provided.

11 Claims, 13 Drawing Sheets

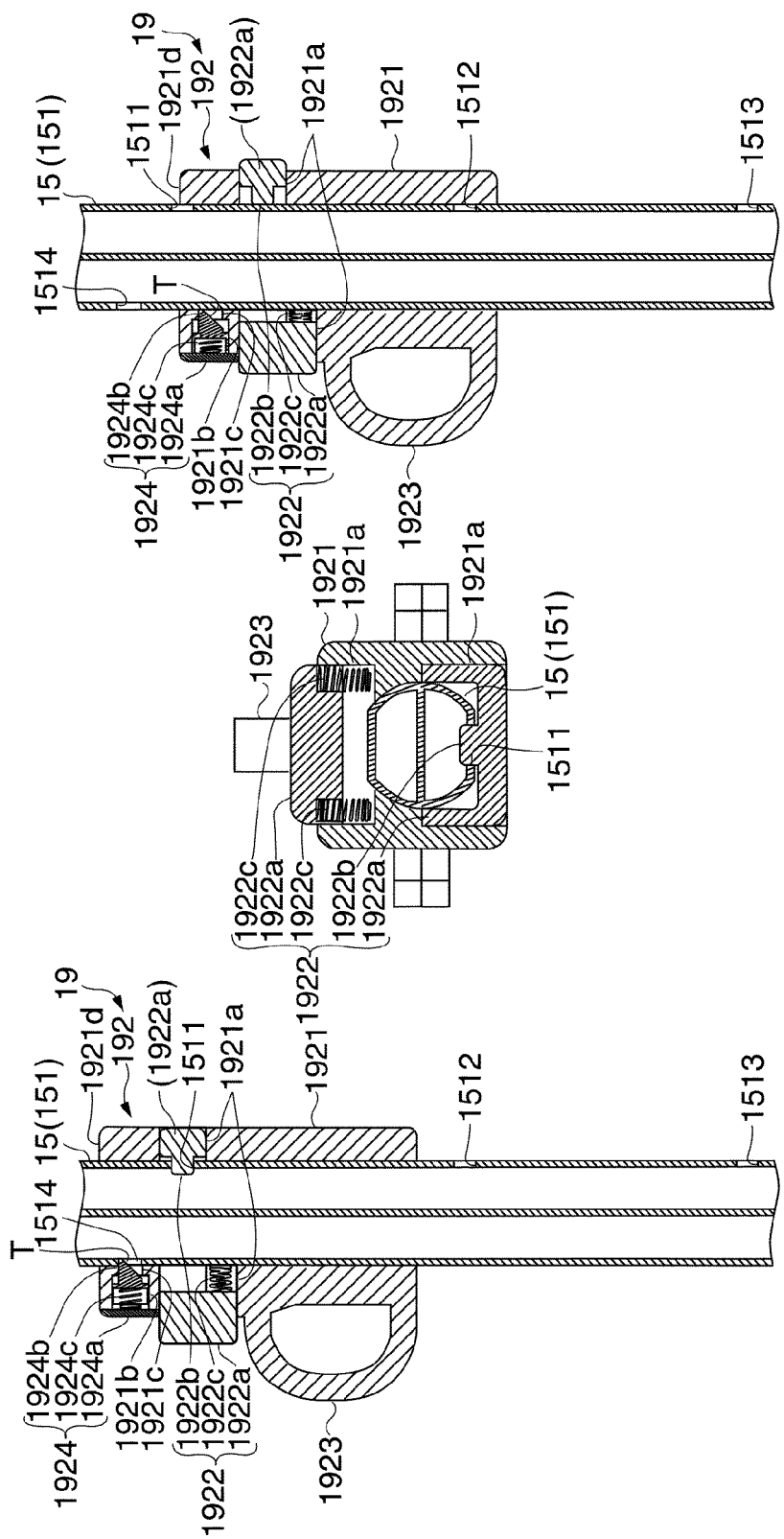

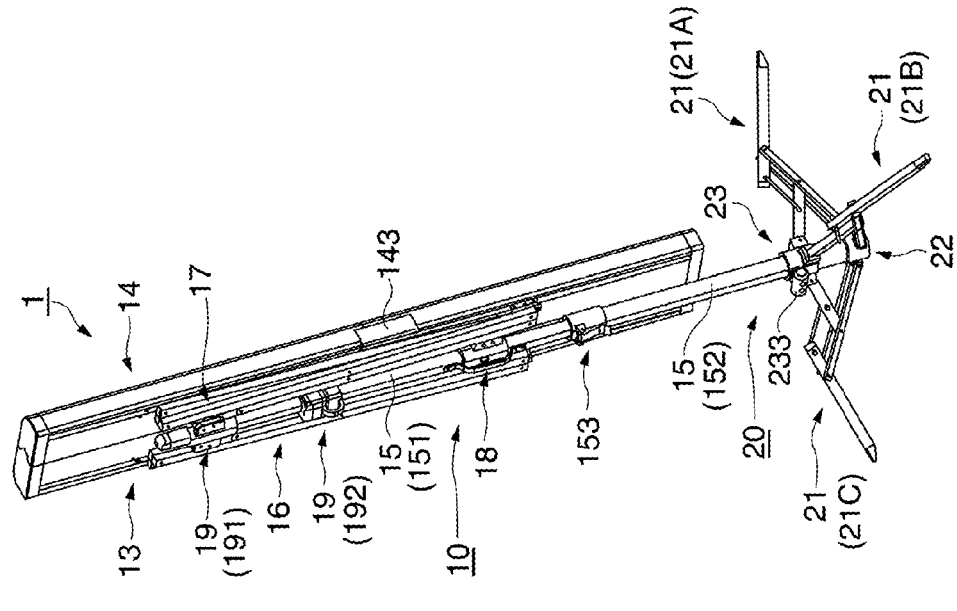
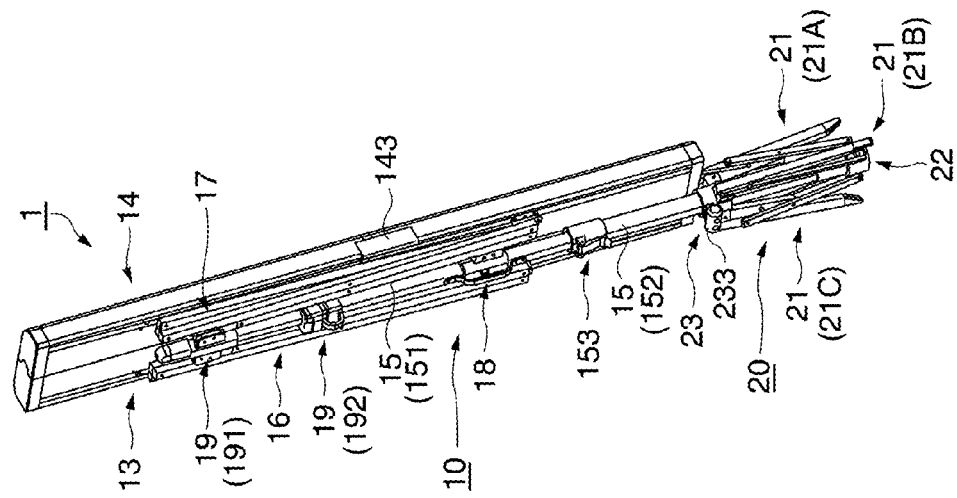

SCREEN

The entire disclosure of Japanese Patent Application No. 2008-178724, filed Jul. 9, 2008, is expressly incorporated by reference herein.

BACKGROUND

1. Technical Field

The present invention relates to a screen.

2. Related Art

Screens in the related art are used by projecting image light projected from a projector or the like in an enlarged scale on a screen surface of a flexible sheet type screen body. Among these screens, there are various portable-type screens used by being carried by users.

Among the portable-type screens, a screen used by opening and closing the screen body in the lateral direction generally includes a screen body on which image light is projected, columns for supporting the screen body on the right side and the left side, opening and closing mechanism for opening and closing the screen body in the lateral direction, and a main column for holding the screen body, the columns, and the opening and closing mechanism. These components are generally arranged in such a manner that the screen body and the columns are arranged in the front and the opening and closing mechanism is arranged behind, and the main column is arranged further behind.

In the structure of the general portable-type screen, since the components are arranged as described above, the center of gravity of the screen is shifted toward the front of the main column, and hence the screen is liable to fall toward the front. Therefore, in order to hold the screen vertically upright with respect to a surface of installation, countermeasures such as improving rigidity of the main column, upsizing a supporting leg for supporting the screen upright, and so on are taken.

A screen disclosed in JP-A-2007-219279 is configured in such a manner that a left movable column is supported by a left end of a pantograph mechanism which is expanded and contracted in the lateral direction, and a right movable column is supported on the right side thereof, and a center portion of the pantograph mechanism is held by a fixed column. Then, the screen body is extended between the right movable column and the left movable column. At least one of the right movable column and the left movable column includes a winding and storing unit for the screen body. The screen includes a driving mechanism for providing a driving force to the pantograph mechanism, and the driving mechanism includes a clutch unit. The screen in this configuration is configured in such a manner that the pantograph mechanism is expanded and contracted by driving the driving mechanism, whereby opening and closing of the screen is automatically achieved. When the expansion and contraction is disabled because the pantograph mechanism comes into contact with an obstacle, the clutch unit is activated to protect the driving mechanism.

However, the screen disclosed in JP-A-2007-219279 has problems such that the configuration of the screen body is generally complicated and is upsized, thereby increasing the weight. Therefore, it is not suitable as a portable-type screen used by being carried by users.

In the general portable-type screens described above, increasing of the thickness of the main column is necessary in order to improve the rigidity of the main column because of the configuration of the screen, so that the screen apparatus is upsized and is increased in weight correspondingly. Accordingly, the portability of the screen is lowered, which results in lowering of the convenience of the screen. Therefore, a screen having a structure in which the weight balance is well achieved, a structure in which the downsizing is achieved, and a structure in which the convenience is improved is demanded.

In the case of the general laterally opening screen, since the weight of the side where the screen winding function is provided (for example, the right column) is increased, the screen gets out of weight balance between the left and right when being deployed, so that the screen might be inclined as a whole. In order to prevent this event, a dummy weight is generally added on the opposite side (left side).

However, the dummy weight simply results in weight increase, so that there arises a problem of lowering of the portability.

Therefore, in the invention, a screen deployment assisting spring is provided on the side opposite from the side where the screen winding function is provided so as to also function as the dummy weight. This spring is relatively heavy, and hence functions as the dummy weight.

SUMMARY

An advantage of some aspects of the invention is to solve the above described problems, and is realized in the following modes or applications.

A screen according to an aspect of the invention includes: a flexible screen body on which image light is projected; a fixed column arranged in a central portion; a first supporting unit and a second supporting unit arranged with the fixed column at the center thereof so as to support the screen body therebetween, one of the first supporting unit and the second supporting unit including a winding member configured to wind the screen body; a first pantograph mechanism and a second pantograph mechanism each having first and second arm members connected crisscross, the first pantograph mechanism and the second pantograph mechanism being installed respectively between the fixed column and the first supporting unit and between the fixed column and the second supporting unit so as to be expandable and contractible; an arm fixing unit configured to pivotally support the first arm member of the first pantograph mechanism and the first arm member of the second pantograph mechanism with respect to the fixed column while supporting the same to be fixed in the vertical direction; and an arm sliding unit configured to pivotally support the second arm member of the first pantograph mechanism and the second arm member of the second pantograph mechanism with respect to the fixed column while allowing the same to slide in the vertical direction, in which the first pantograph mechanism and the second pantograph mechanism are expanded and contracted to move the first supporting unit and the second supporting unit toward and away from each other by a sliding movement of the arm sliding unit, and an urging member configured to urge the first supporting unit and the second supporting unit to move away from each other is provided.

The screen has a two-section structure having the first pantograph mechanism and the second pantograph mechanism, which are installed respectively between the first supporting unit and the second supporting unit about the fixed column which is substantially at the center. In this configuration, in comparison with the screen provided with the pantograph mechanism having the first pantograph mechanism and the second pantograph mechanism formed integrally with each other and held by the fixed column, the flexibility of the position of arrangement of the first pantograph mechanism and the second pantograph mechanism with respect to the screen body and the fixed column is increased. Therefore, the center of the weight balance of the screen may be set in the direction of the column of the fixed column, so that it is not necessary to compensate the weight balance by increasing the thickness of the fixed column as in the related art.

The single arm fixing unit is fixed to the fixed column, and pivotally supports the arm members, which are one of the arm members of each of the first pantograph mechanism and the second pantograph mechanism installed on the side of the fixed column. Then, the single arm sliding unit is slidably supported along the fixed column and pivotally supports the arm members which are the other one of the arm members of each of the first pantograph mechanism and the second pantograph mechanism installed on the side of the fixed column. In this configuration, in comparison with a case where the two sliding components are used for pivotally supporting the arm members of both the first pantograph mechanism and the second pantograph mechanism and configured to be slidable, the sliding component (arm sliding unit) is configured by a single unit, a compact configuration is achieved. Also, since the sliding component (arm sliding unit) is configured by a single unit and the arm members, which are one of the arm members of each of the first pantograph mechanism and the second pantograph mechanism, are fixed and only the arm members, which are the other one of those, are allowed to slide, the first pantograph mechanism and the second pantograph mechanism are allowed to be expanded and contracted stably in comparison with a case where there are two units of the sliding components. Therefore, the first supporting unit and the second supporting unit may be moved toward and away from each other stably.

Therefore, in this configuration, a screen having a structure in which the weight balance is achieved, downsizing is achieved, and the first supporting unit and the second supporting unit are moved toward and away from each other stably is realized.

Since the screen described above includes the urging member configured to urge the first supporting unit and the second supporting unit away from each other, the force to move the first supporting unit and the second supporting unit away from each other or a force to slide the arm sliding unit required for the user to deploy the screen body may be reduced.

Preferably, the first supporting unit includes a fixed portion of the first supporting unit configured to pivotally support the first arm member of the first pantograph mechanism with respect to the first supporting unit while supporting the same to be fixed in the vertical direction and a sliding member of the first supporting unit configured to pivotally support the second arm member of the first pantograph mechanism with respect to the first supporting unit while allowing the same to slide in the vertical direction, and the second supporting unit includes a fixed portion of the second supporting unit configured to pivotally support the first arm member of the second pantograph mechanism with respect to the second supporting unit while supporting the same to be fixed in the vertical direction and a sliding member of the second supporting unit configured to pivotally support the second arm member of the second pantograph mechanism with respect to the second supporting unit while allowing the same to slide in the vertical direction.

According to the screen described above, the first supporting unit includes the fixed portion of the first supporting unit and a sliding member of the first supporting unit, and the second supporting unit includes the fixed portion of the second supporting unit and a sliding member of the second supporting unit. In this configuration, the first pantograph mechanism and the second pantograph mechanism expand and contract by sliding the arm sliding unit, and the screen body is expanded and opened and closed by moving the first supporting unit and the second supporting unit toward and away from each other.

In this configuration, since the sliding components (sliding member of the first supporting unit and a sliding member of the second supporting unit) are each configured as one unit, a compact configuration is achieved in comparison with the case in which a slidable configuration is achieved by pivotally supporting the arm members of both the first pantograph mechanism and the second pantograph mechanism so as to be slidable using two each sliding components for the first supporting unit and the second supporting unit. Also, since the sliding components (sliding member of the first supporting unit and sliding member of the second supporting unit) are respectively configured by a single unit and the arm members, which are one of the arm members of each of the first pantograph mechanism and the second pantograph mechanism, are fixed and only the arm members, which are the other one of those, are allowed to slide, the first pantograph mechanism and the second pantograph mechanism are allowed to be expanded and contracted stably in comparison with a case where there are two units of the sliding components, whereby stable opening and closing of the screen body is achieved.

Preferably, the arm sliding unit includes a portion for fixing the arm to the fixed column which enables fixation of the same at a predetermined position of the fixed column.

The screen as described above includes the portion for fixing the arm to the fixed column, which fixes the arm sliding unit at a predetermined position on the fixed column. Accordingly, by setting the position to fix the arm sliding unit, the area on the screen surface of the screen body on which the image light is projected (projecting area) may be set, and the screen body may be deployed to and fixed at a size in which the desired area is secured on the screen surface. Therefore, the screen body may be set to a compact length of deployment that the user desires, so that the convenience of the screen is improved.

Preferably, the portion for fixing the arm to the fixed column fixes an arm sliding unit to a predetermined position to cause the aspect ratio of the projecting area formed on the screen body to correspond to the aspect ratio of the projected image light.

In the screen as described above, when the aspect ratio of the projected image light is, for example, "16:9", the portion for fixing the arm to the fixed column is slid to a position where the aspect ratio of the projecting area formed by the deployed screen body is "16:9" by moving the first supporting unit and the second supporting unit away from each other, and the arm sliding unit is fixed to the predetermined position. In other words, the predetermined position is set to a position where the aspect ratio of the projected image light matches the aspect ratio of the projecting area formed on the screen body.

Accordingly, when the aspect ratios of the projected image lights are, for example, "16:10" or "4:3", the aspect ratios of the projecting areas formed by the screen body are also "16:10" or "4:3", so that setting to the projecting areas corresponding to the aspect ratios that the user desires is easily achieved, so that the convenience of the screen is improved. Also, since the possibility of remaining of the margin on the vertical direction or the lateral direction of the screen body is minimized by setting the projecting area of the screen body corresponding to the aspect ratio of the image light, visual discomfort that the user feel may be reduced.

Preferably, the arm sliding unit includes a portion for fixing the arm to the fixed column separately.

In the screen as described above, since the arm sliding unit includes the portion for pivotally supporting the arm members intersecting respectively in the first pantograph mechanism and the second pantograph mechanism separately from the portion for fixing the arms to the fixed column, the portion for fixing the arm to the fixed column may be fixed to the desired predetermined position easily. Then, what is necessary is just to slide the portion for pivotally supporting the arm member to the portion for fixing the arm to the fixed column, so that the operability of the arm sliding unit is improved.

Preferably, the urging member is installed at least one of the first supporting unit and the second supporting unit.

According to the screen as described above, since the urging member is installed on at least one of the first supporting portion and the second supporting unit, a force that the user is required for deploying the screen body may be reduced. Also, since the urging member may be stored in the interior of the first supporting unit or the second supporting unit, it may be installed without giving a visual discomfort as an appearance, and inconvenience such that the user's hand interferes with the urging member when he or she makes an expanding operation may be prevented, and the security of the operation is improved. Specifically, when the winding member configured to wind the screen body is installed, for example, in the first supporting unit, the weight balance between the first supporting unit and the second supporting unit with the fixed column at the center is achieved by installing the urging member in the second supporting unit, so that the inclination of the screen body in the direction of the surface of the screen is restrained.

Preferably, the urging member is installed on the fixed column.

According to the screen as described above, since the urging member is installed on the fixed column, a force that the user is required for deploying the screen body may be reduced. Also, since the urging member may be stored in the interior of the fixed column, it may be installed without giving a visual discomfort as an appearance, and when the user makes the expanding operation, inconvenience such that his or her hand interferes with the urging member may be prevented, and the security of the operation is improved.

Preferably, the urging member is installed on the arm member of at least one of the first pantograph mechanism and the second pantograph mechanism.

According to the screen as described above, a force that the user is required for deploying the screen body may be reduced.

Preferably, the urging member is a coil spring.

According to the screen as described above, since the urging member is the coil spring, manufacture and assembly is facilitated. The long term reliability is also secured.

Preferably, the fixed column and a plurality of the arm members which constitute the first pantograph mechanism and the second pantograph mechanism are formed of a hollow column-shaped member.

According to the screen as described above, since the fixed column and the plurality of arm members which constitute the first pantograph mechanism and the second pantograph mechanism are formed of the hollow column-shaped member, a force of rigidity required for the fixed column and the plurality of arm members could be secured. Furthermore, the possibility that the user's finger could be caught between the intersecting arm members when expanding and contracting (specifically when folding) the first pantograph mechanism and the second pantograph mechanism is reduced.

Preferably, a supporting leg configured to be connected to the fixed column for supporting the screen upright and having a plurality of legs which come into abutment with a surface of installation on which the screen is installed.

According to the screen as described above, since the supporting leg having the plurality of legs is provided, the screen may be supported upright in abutment with the surface of installation stably.

A screen apparatus according to a second aspect of the invention includes: a screen; a fixed column arranged at a center; a left movable column and a right movable column arranged on the left and right of the fixed column for extending the screen therebetween, one of the left movable column and the right movable column including a winding storage for the screen; a pantograph mechanism having a plurality of rods, being configured to support the left movable column at a left end and the right movable column at a right end, being slidably supported at the center portion thereof by the fixed column, and being configured to be expanded and contracted in the lateral direction; and an urging member configured to urge the pantograph mechanism for expanding and contracting the pantograph mechanism in the lateral direction, in which the urging member is provided on the movable column opposite from the one of the left and right movable columns including the winding storage.

BRIEF DESCRIPTION OF THE DRAWINGS

The invention will be described with reference to the accompanying drawings where like numbers reference like elements.

FIGS. 5A to 5C is a cross-sectional view of a portion for fixing an arm to a fixed column.

FIG. 11A is a perspective view of the screen in a state in which the screen body is closed and legs are closed.

FIG. 11B is a perspective view of the screen in a state in which the screen body is closed and the legs are opened.

DESCRIPTION OF EXEMPLARY EMBODIMENTS

Figure 1:
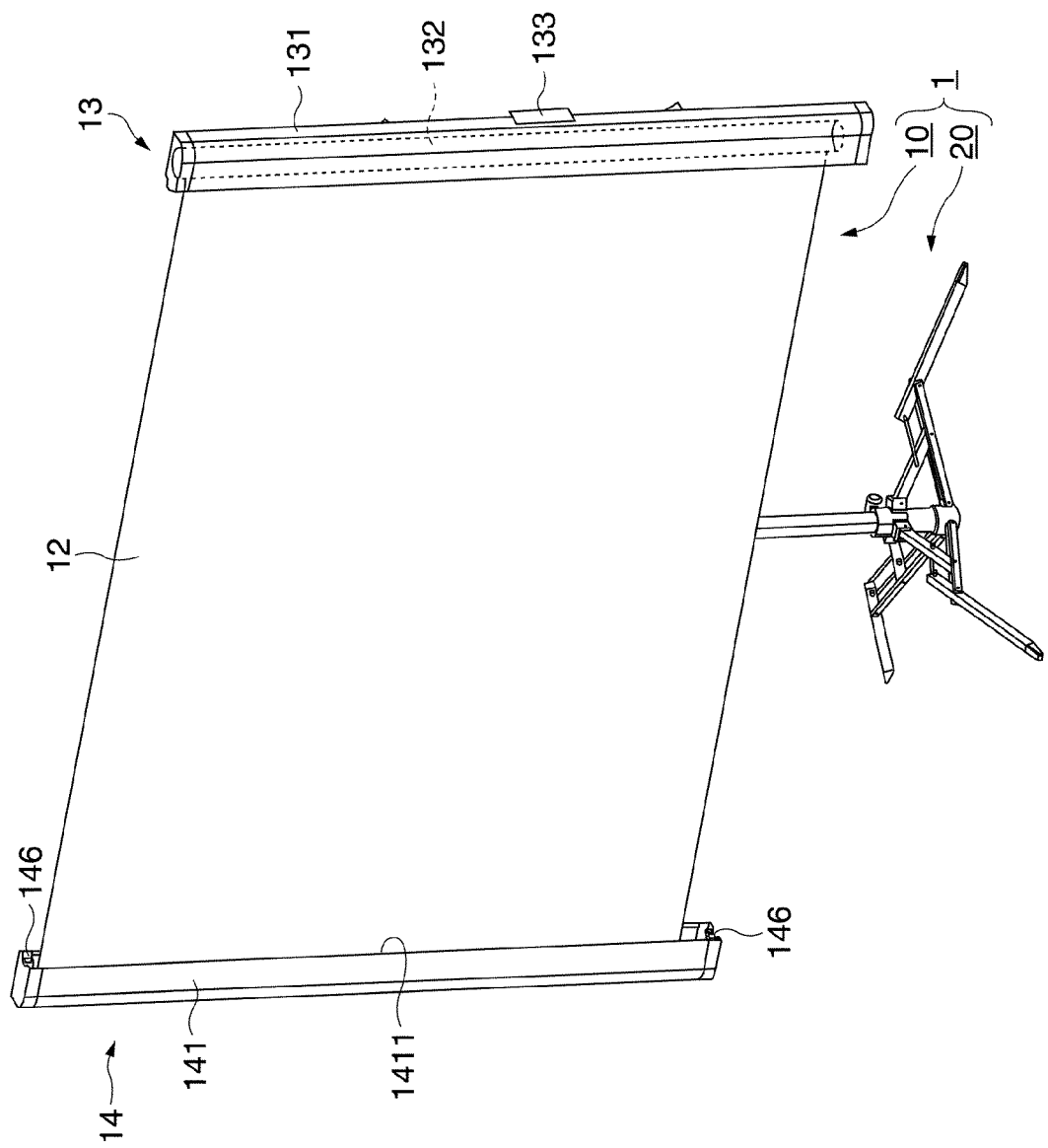
FIG. 1 is a perspective view showing a schematic configuration of a screen according to a first embodiment.

Referring now to the drawings, embodiments will be described below.

First Embodiment

Figure 2:
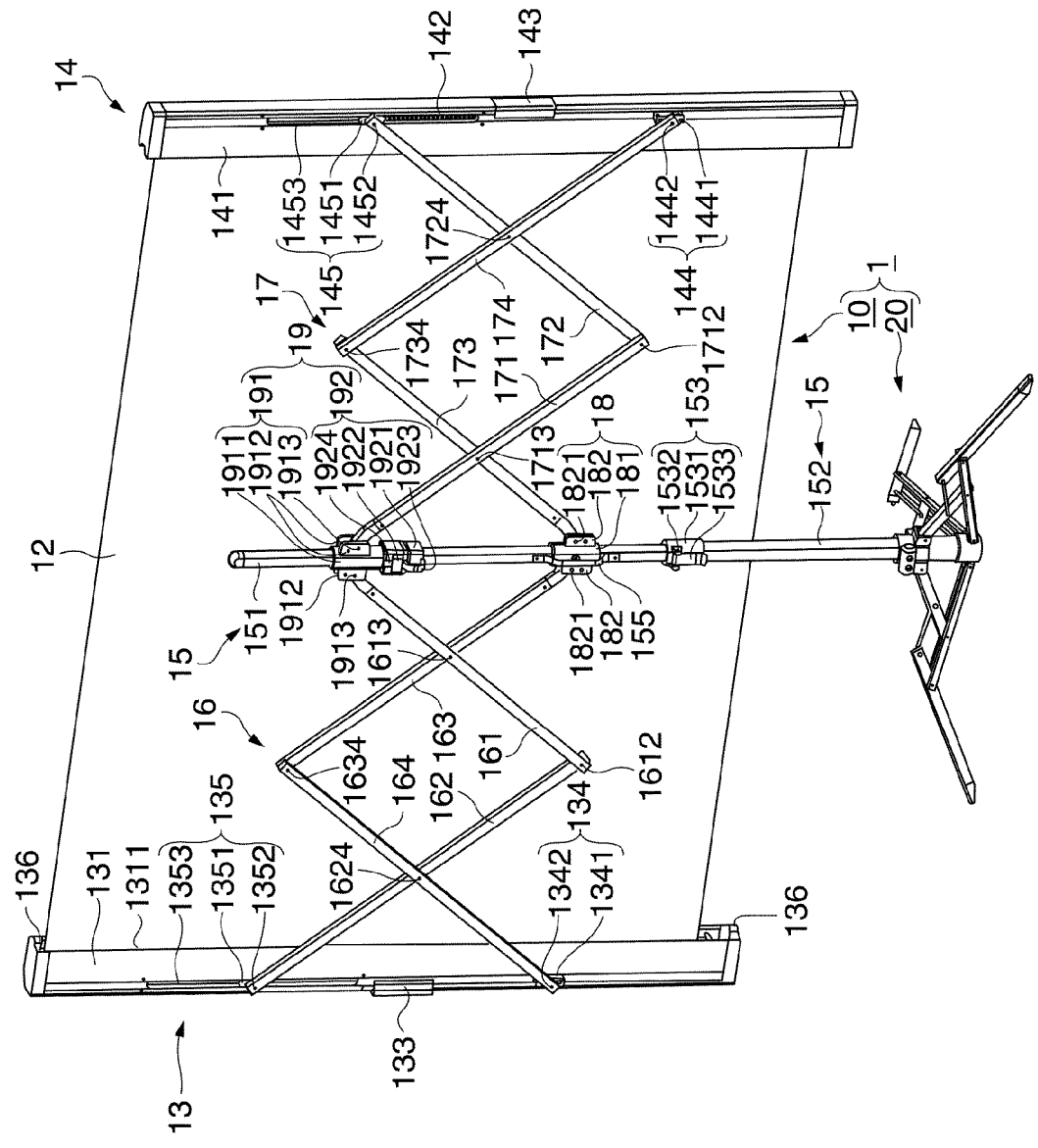
FIG. 2 is a perspective view showing the schematic configuration of the screen.
Figure 3:
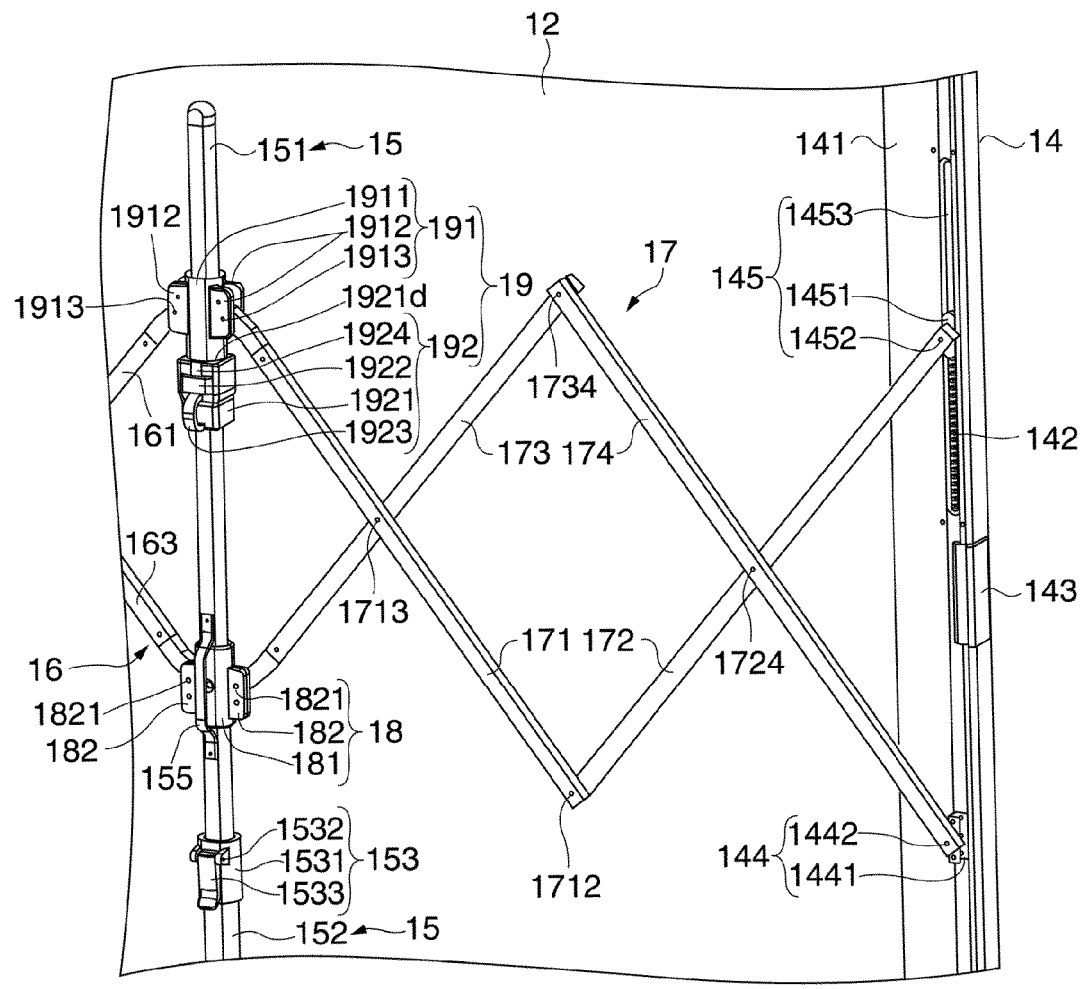
FIG. 3 is a partially enlarged view of a principal portion of the screen viewed from the back side.

FIG. 1 and FIG. 2 are perspective views showing a schematic configuration of a screen according to a first embodiment. FIG. 1 is a perspective view of a screen 1 viewed from the front from which image light enters, and FIG. 2 is a perspective view of the screen 1 viewed from the back side. FIG. 3 is a partially enlarged view of a principal portion of the screen viewed from the back side. FIG. 3 shows a second pantograph mechanism 17, a fixed column 15, a second supporting unit 14, and so on. Referring now to FIGS. 1 to 3, the configuration of the screen 1 will be described. The "left" and "right" described below mean the left and right of the screen 1 when viewed from the back side.

On the screen 1, the image light projected in an enlarged scale, for example, from a projector or the like, not shown, is projected. As shown in FIG. 1 and FIG. 2, the screen 1 roughly includes an image projecting portion 10 and a supporting leg 20.

As shown in FIG. 1 or FIG. 2, the image projecting portion 10 includes a screen body 12 as a part where the image light is projected, the fixed column 15, a first supporting unit 13, the second supporting unit 14, a first pantograph mechanism 16, the second pantograph mechanism 17, an arm fixing unit 18, and an arm sliding unit 19. The screen body 12 is formed of a reflection-type screen which is a flexible sheet shape and reflects and displays the image light entering to the front side thereof.

The first supporting unit 13 is a portion extending along a left end portion of both left and right ends of the screen body 12 having a rectangular shape, and supporting the left end portion of the screen body 12. As shown in FIG. 1 or FIG. 2, the first supporting unit 13 includes a first supporting housing 131, a spring roll 132 as a winding member configured to wind the screen body 12, a first gripping member 133, a fixed portion 134 of the first supporting unit, and a sliding member 135 of the first supporting unit.

As shown in FIG. 1 or FIG. 2, the first supporting housing 131 is a housing having a vertically extending substantially rectangular parallelepiped shape and includes the spring roll 132 stored in the interior thereof so as to be capable of rotating. As shown in FIG. 2, the left end surface of the first supporting housing 131 is formed with an opening 1311 for allowing insertion of the screen body 12 in the interior and exterior thereof.

As shown in FIG. 1, the spring roll 132 is a member being rotatable about the vertical direction of the screen body 12 as a pivotal axis for winding the screen body 12. Although not shown in detail, the spring roll 132 is urged in the direction of winding the screen body 12 by a spring and has a function to wind the screen body 12 automatically when a force to pull the screen body 12 is released.

As shown in FIG. 1 or FIG. 2, the first gripping member 133 is a member attached on the first supporting housing 131 at a substantially central portion in the vertical direction at a corner between the left side surface and the back surface thereof to be gripped by a user for moving the first supporting unit 13 in the lateral direction.

As shown in FIG. 2, the fixed portion 134 of the first supporting unit is configured on the side of the back surface of the first supporting housing 131, and pivotally supports an arm member 164 of the first pantograph mechanism 16, described later. More specifically, the fixed portion 134 of the first supporting portion is fixed to the back side of the first supporting housing 131 by fixing a fixing portion body 1341 of the first supporting unit having a substantially rectangular shape thereto, and pivotally supporting the arm member 164 via a pivotal shaft 1342.

As shown in FIG. 2, the sliding member 135 of the first supporting unit is a member being configured above the fixed portion 134 of the first supporting unit on the back side of the first supporting housing 131 for slidably and pivotally supporting an arm member 162 of the first pantograph mechanism 16, described later. More specifically, the sliding member 135 of the first supporting unit includes a sliding hole 1353, a main body 1351, and a pivotal shaft 1352. The sliding hole 1353 is formed into a slit shape along the vertical direction of the first supporting housing 131 on the back side of the first supporting housing 131. The main body 1351 is formed into a substantially H-shape in the horizontal cross section which is slidable along the outer periphery of the sliding hole 1353. Then, the main body 1351 pivotally supports the arm member 162, described later, via the pivotal shaft 1352.

The second supporting unit 14 is a portion which extends along the right end portion of the screen body 12, and supports the right end portion of the screen body 12. As shown in FIGS. 1 to 3, the second supporting unit 14 includes a second supporting housing 141, a second gripping member 143, a coil spring 142 as an urging portion for urging the arm member, described later, a fixed portion 144 of the second supporting unit, and a sliding member 145 of the second supporting unit.

As shown in FIGS. 1 to 3, the second supporting housing 141 has substantially the same shape as the first supporting housing 131, and supports the right end portion of the screen body 12 in the interior thereof via an opening 1411 (see FIG. 1) formed on the left end surface.

As shown in FIG. 2 or FIG. 3, the second gripping member 143 is a member having substantially the same shape as the first gripping member 133, attached to the second supporting housing 141 at a substantially central portion in the vertical direction at a corner between the right side surface and the back surface thereof and gripped by the user for moving the second supporting unit 14 in the lateral direction.

As shown in FIG. 2 or FIG. 3, the fixed portion 144 of the second supporting unit is a member being configured on the back side of the second supporting housing 141 for pivotally supporting an arm member 174 of the second pantograph mechanism 17, described later. More specifically, the fixed portion 144 of the second supporting portion is fixed to the back side of the second supporting housing 141 by fixing a fixing portion body 1441 having a substantially C-shape in horizontal cross-section thereto and pivotally supporting the arm member 174 via a pivotal shaft 1442.

As shown in FIG. 2 or FIG. 3, the sliding member 145 of the second supporting unit is a member being configured above the fixed portion 144 of the second supporting unit on the back side of the second supporting housing 141 for slidably and pivotally supporting an arm member 172 of the second pantograph mechanism 17, described later. More specifically, the sliding member 145 of the second supporting unit includes a sliding hole 1453, a main body 1451, and a pivotal shaft 1452. The sliding hole 1453 is formed into a slit shape along the vertical direction of the second supporting housing 141 on the back side of the second supporting housing 141. The main body 1451 is formed into a substantially H-shape in the horizontal cross section which is slidable along the outer periphery of the sliding hole 1453. Then, the main body 1451 is pivotally supports the arm member 172, described later, via the pivotal shaft 1452.

Figure 4:
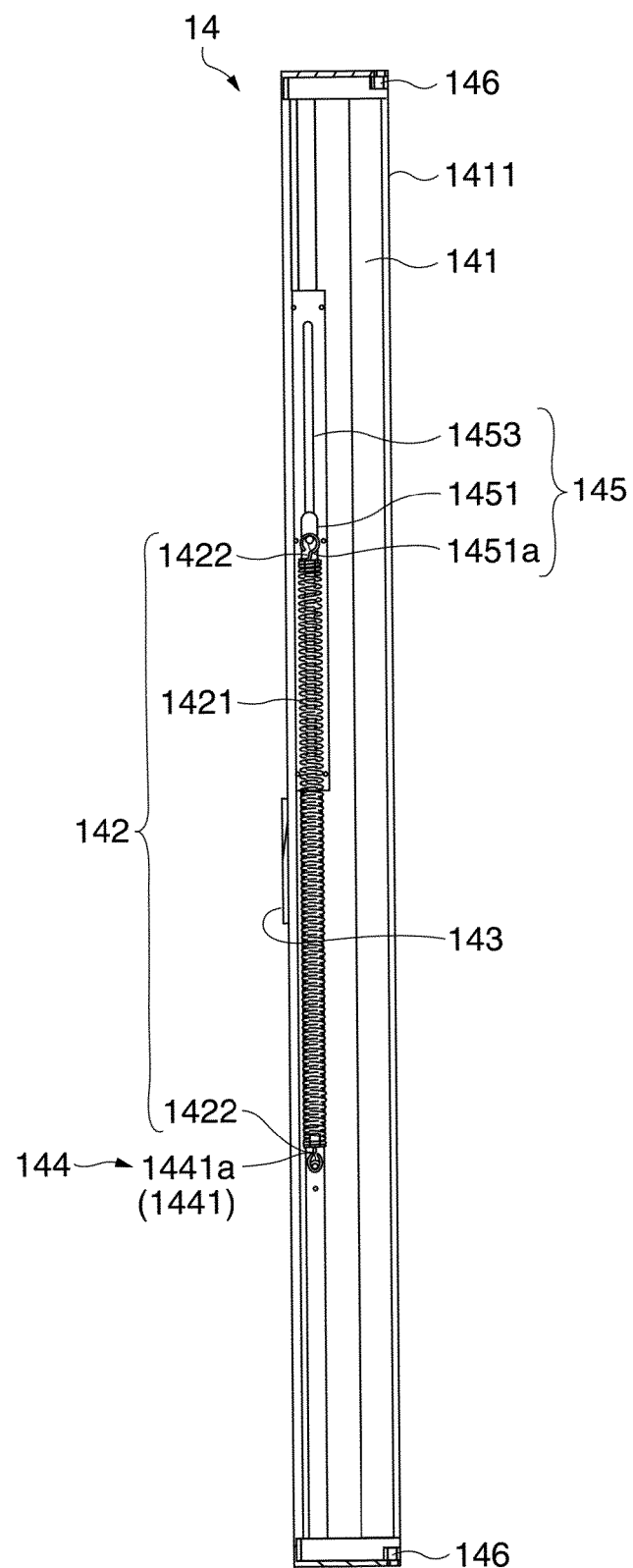
FIG. 4 is a plan view showing a configuration of an urging member.

FIG. 4 is a plan view showing a configuration of the urging member. FIG. 4 is a plan view when the second supporting unit 14 shown in FIG. 2 is cut in parallel to the screen body 12 and viewed from the front side. In other words, it is a drawing showing a state of viewing the urging member from the inside of the second supporting unit 14. Referring now to FIG. 4, the urging member will be described.

The urging member is a member for urging the first supporting unit 13 and the second supporting unit 14 in the direction to move away from each other. In the first embodiment, it is installed inside the second supporting unit 14. In the first embodiment, the coil spring 142 is used as the urging member. As shown in FIG. 4, the coil spring 142 is formed as a tension coil spring, and includes a spring body 1421, and hooks 1422 formed on both ends of the spring body 1421.

As shown in FIG. 4, the main body 1451 of the sliding member 145 of the second supporting unit is formed with a projecting portion 1451a projecting on the side of the inner surface of the second supporting housing 141. One of the hooks 1422 of the coil spring 142 is hooked and fixed to the projecting portion 1451a. As shown in FIG. 4, the fixing portion body 1441 of the fixed portion 144 of the second supporting unit is formed with a projecting portion 1441a projecting on the side of the inner surface of the second supporting housing 141. The other hook 1422 of the coil spring 142 is hooked and fixed to the projecting portion 1441a. As shown in FIG. 2 or FIG. 3, part of the spring body 1421 of the coil spring 142 configured and fixed in this manner is visible from the sliding hole 1453 of the second supporting unit 14.

As shown in FIG. 2, the fixed column 15 is arranged at a center between the first supporting unit 13 and the second supporting unit 14, and extends in parallel to a plane of the screen body 12 in the vertical direction. The fixed column 15 includes two members of a first fixed column 151 and a second fixed column 152. Then, the fixed column 15 is formed of a hollow column-shaped member of a substantially track shape in horizontal cross-section.

As shown in FIG. 2 and FIG. 3, the first fixed column 151 is inserted into the fixed column 15 from an upper end portion of the second fixed column 152, so that the first fixed column 151 is capable of advancing and retracting in the direction of extension (vertically). Then, after having adjusted the length of extension of the first fixed column 151 by a column fixing portion 153 installed at the upper end portion of the second fixed column 152, the first fixed column 151 is fixed to the second fixed column 152. In other words, by adjusting the length of the first fixed column 151 extending with respect to the second fixed column 152, the screen body 12 may be adjusted in height from the surface of installation (for example, a floor surface), and may be fixed by the column fixing portion 153.

As shown in FIG. 2 and FIG. 3, the column fixing portion 153 includes a column fixing portion body 1531 having a cylindrical shape and installed on the second fixed column 152 by fitting onto the second fixed column 152 from the upper end portion thereof, and a lever portion 1533 pivotally supported and fixed to the column fixing portion body 1531 by a pivotal shaft 1532. Then, in FIG. 2 and FIG. 3, when the lever portion 1533 is rotated upward, an abutting portion 1534 (see FIG. 7) formed on the side of the inner surface of the column fixing portion body 1531 releases the abutment of the first fixed column 151 with the side surface portion. Accordingly, the first fixed column 151 is capable of advancing and retracting with respect to the second fixed column 152. As shown in FIG. 2 or FIG. 3, when the lever portion 1533 is rotated downward, the abutting portion 1534 comes into abutment with the side surface portion of the first fixed column 151. Accordingly, the first fixed column 151 is fixed to the second fixed column 152 by a frictional force with respect to the abutting portion 1534.

As shown in FIG. 2 and FIG. 3, the first pantograph mechanism 16 and the second pantograph mechanism 17 are members installed so as to be capable of expanding and contracting between the fixed column 15 and the first supporting unit 13, and between the fixed column 15 and the second supporting unit 14, and expanded and contracted about the fixed column 15 as a center for bringing the first supporting unit 13 and the second supporting unit 14 into proximity and deployment. The first pantograph mechanism 16 and the second pantograph mechanism 17 include a plurality of arm members, described later, connected so as to intersect each other and are configured to be bendable and stretchable. The first pantograph mechanism 16 and the second pantograph mechanism 17 in the first embodiment are installed in parallel to the screen body 12 with the intermediary of the fixed column 15 at a narrow distance from the screen body 12.

As shown in FIG. 2 and FIG. 3, the arm fixing unit 18 is a member configured to pivotally support one intersecting arm member 163, described later, of the first pantograph mechanism 16 and one intersecting arm member 173, described later, of the second pantograph mechanism 17 and fix the same to a predetermined position of the fixed column 15 (first fixed column 151). As shown in FIG. 2 and FIG. 3, the arm sliding unit 19 is a member slidably supported along the fixed column 15 (first fixed column 151) for pivotally supporting the other intersecting arm member 161, described later, of the first pantograph mechanism 16 and the other intersecting arm member 171, described later, of the second pantograph mechanism 17.

Referring now to FIG. 2 and FIG. 3, the configuration and the operation of the first pantograph mechanism 16, the second pantograph mechanism 17, the arm fixing unit 18, and the arm sliding unit 19 will be described in detail.

The first pantograph mechanism 16 is installed between the fixed column 15 and the first supporting unit 13. Then, as a plurality of arm members connected crisscross so as to be bendable and stretchable, four arm members 161, 162, 163, and 164 formed of hollow column-shaped member are included in the first embodiment. More specifically, the arm members 161 and 162 are pivotally supported and connected by a pivotal shaft 1612 lying substantially orthogonally to the screen body 12 at end portions thereof, and the arm members 163 and 164 are pivotally supported and connected by a pivotal shaft 1634 lying substantially orthogonally to the screen body 12 at end portions thereof.

The arm members 161, 162 and the arm members 163, 164 are further pivotally supported and connected by a pivotal shaft 1613 at substantially center portions of the arm member 161 and the arm member 163. The arm member 162 and the arm member 164 are pivotally supported and connected by a pivotal shaft 1624 at substantially centers thereof. By such connections, the arm members 161, 162, 163, and 164 assume a pantograph shape, and constitute the first pantograph mechanism 16.

The arm member 163 which is one intersecting arm member of the first pantograph mechanism 16 is pivotally supported by the arm fixing unit 18 by a pivotal shaft 1821 at an end thereof. The arm member 161 which is the other intersecting arm member of the first pantograph mechanism 16 is pivotally supported by the arm sliding unit 19 by a pivotal shaft 1913 at an end thereof.

The arm member 164 which is one intersecting arm member of the first pantograph mechanism 16 is fixed to the fixed portion 134 of the first supporting unit of the first supporting unit 13 at an end thereof, and is pivotally supported by the pivotal shaft 1342. Then, the arm member 162 which is the other intersecting arm member of the first pantograph mechanism 16 is pivotally supported by the sliding member 135 of the first supporting unit of the first supporting unit 13 by the pivotal shaft 1352 at an end thereof, and is slidable along the sliding hole 1353.

The second pantograph mechanism 17 is configured in the same manner as the first pantograph mechanism 16, and is installed on the opposite side of the first pantograph mechanism 16 in symmetry with respect to the fixed column 15 as a center.

More specifically, the second pantograph mechanism 17 is installed between the fixed column 15 and the second supporting unit 14. Then, as a plurality of arm members connected crisscross so as to be bendable and stretchable, four arm members 171, 172, 173, and 174 formed of hollow column-shaped member are included in the first embodiment. More specifically, the arm members 171 and 172 are pivotally supported and connected by a pivotal shaft 1712 lying substantially orthogonally to the screen body 12 at end portions thereof, and the arm members 173 and 174 are pivotally supported and connected by a pivotal shaft 1734 lying substantially orthogonally to the screen body 12 at end portions thereof.

The arm members 171, 172 and the arm members 173, 174 are further pivotally supported and connected by a pivotal shaft 1713 at substantially center portions of the arm member 171 and the arm member 173. The arm member 172 and the arm member 174 are pivotally supported and connected by a pivotal shaft 1724 at substantially centers thereof. By such connections, the arm members 171, 172, 173, and 174 assume a pantograph shape, and constitute the second pantograph mechanism 17.

The arm member 173 which is one intersecting arm member of the second pantograph mechanism 17 is pivotally supported by the arm fixing unit 18 by the pivotal shaft 1821 at an end thereof. The arm member 171 which is the other intersecting arm member of the second pantograph mechanism 17 is pivotally supported by the arm sliding unit 19 by the pivotal shaft 1913 at an end thereof.

The arm member 174 which is one intersecting arm member of the second pantograph mechanism 17 is fixed to the fixed portion 144 of the second supporting unit of the second supporting unit 14 at an end thereof, and is pivotally supported by the pivotal shaft 1442. Then, the arm member 172 which is the other intersecting arm member of the second pantograph mechanism 17 is pivotally supported by the sliding member 145 of the second supporting unit of the second supporting unit 14 by the pivotal shaft 1452 at an end thereof, and is slidable along the sliding hole 1453.

The arm fixing unit 18 is fixed to the fixed column 15 (first fixed column 151) downward of the arm sliding unit 19. The arm fixing unit 18 includes an arm fixing unit body 181 having a cylindrical shape and being fitted on the first fixed column 151 and fixed to the first fixed column 151 via a screw or the like, and a pair of arm fixing and pivotally supporting portions 182 passing substantially through a center axis of the arm fixing unit body 181 and projecting in a rectangular shape in the direction parallel to the surface of the screen body 12. The arm fixing unit 18 pivotally supports one of the ends of the arm member 163 and arm member 173 respectively by the pair of arm fixing and pivotally supporting portions 182 by the pivotal shaft 1821 installed substantially orthogonal to the screen body 12.

On the fixed column 15 (first fixed column 151), a gripping portion 155 formed in a substantially arch shape in a form of straddling the arm fixing unit 18 (arm fixing unit body 181) in the vertical direction is fixed to the arm fixing unit body 181 by a screw or the like. This gripping portion 155 is a member for stabilizing the fixed column 15 by being gripped by the user when deploying or folding the screen body 12.

The arm sliding unit 19 is installed above the arm fixing unit 18. Then, the arm sliding unit 19 separately includes two members of a portion 191 for causing the arm to slide along the fixed column and a portion 192 for fixing the arm to the fixed column.

The portion 192 for fixing the arm to the fixed column is a member for determining a deployed size of the screen body 12 correspondingly to an aspect ratio of the image light projected on the screen body 12. The portion 191 for causing the arm to slide along the fixed column is a member located upward of the portion 192 for fixing the arm to the fixed column for locating and fixing the portion 192 for fixing the arm to the fixed column at a predetermined position on the first fixed column 151, and then causing the same to slide until it comes into abutment with an upper end surface 1921$d$ (see FIG. 3) of the portion 192 for fixing the arm to the fixed column. When the screen body 12 is deployed until the portion 192 for fixing the arm to the fixed column comes into abutment with the portion 191 for causing the arm to slide along the fixed column by the first pantograph mechanism 16 and the second pantograph mechanism 17, the size of the deployed screen body 12 corresponds to the aspect ratio determined by the portion 192 for fixing the arm to the fixed column.

FIGS. 5A to 5C are cross-sectional views of the portion 192 for fixing the arm to the fixed column. FIG. 5A is a vertical cross-sectional view of the portion 192 for fixing the arm to the fixed column, FIG. 5B is a horizontal cross-sectional view of the portion 192 for fixing the arm to the fixed column, and FIG. 5C is a vertical cross-sectional view showing a state in which the portion 192 for fixing the arm to the fixed column is slid. Referring now to FIG. 3 and FIGS. 5A to 5C, a configuration and operation of the portion 192 for fixing the arm to the fixed column will be described.

The portion 192 for fixing the arm to the fixed column is formed into a cylindrical shape and fitted on the first fixed column 151. Then, the portion 192 for fixing the arm to the fixed column includes a slide fixing body 1921 as a base, a fixed operating portion 1922, a slide gripping portion 1923, and a slide restricting portion 1924.

The slide gripping portion 1923 is formed into a substantially arch shape on the lower portion of the side surface of the slide fixing body 1921. The slide gripping portion 1923 is a member for allowing the user to grip to slide the portion 192 for fixing the arm to the fixed column along the first fixed column 151.

The fixed operating portion 1922 is installed above the slide gripping portion 1923 and, as shown in FIGS. 5A to 5C, includes a fixed operating portion body 1922a, a fixed projecting portion 1922b, and a fixing spring 1922c. The fixed operating portion 1922 is installed by being guided by a first guide portion 1921a formed on the slide fixing body 1921. The fixed operating portion body 1922a is guided by the first guide portion 1921a, and stores a fixing spring 1922c between the fixed operating portion body 1922a and the first guide portion 1921a. The fixed operating portion body 1922a is installed so as to project from the slide fixing body 1921 above the slide gripping portion 1923 so as to be pressed inward in the direction substantially vertical to the direction of extension of the fixed column 15.

The fixed projecting portion 1922b is a member formed on the fixed operating portion body 1922a, and projecting from the fixed operating portion body 1922a inward toward the fixed column 15 on the side of the screen body 12. The fixed projecting portion 1922b is fitted into any one of a first fixing hole 1511, a second fixing hole 1512, and a third fixing hole 1513 formed on the fixed column 15 on the side surface of the screen body 12, so that the portion 192 for fixing the arm to the fixed column is fixed to the fixed column 15.

Drawings in FIG. 5A and FIG. 5B show a state in which the fixed projecting portion 1922b of the portion 192 for fixing the arm to the fixed column is fitted to the first fixing hole 1511 formed on the fixed column 15 and fixed therein. The first fixing hole 1511 is a hole for determining the size of deployment of the screen body 12 correspondingly to the image light of an aspect ratio "4:3". The second fixing hole 1512 is a hole corresponding to the image light of an aspect ratio of "16:10" and the third fixing hole 1513 is a hole corresponding to the image light of an aspect ratio "16:9". In this case, the first fixing hole 1511 is positioned at an uppermost position from among the three holes, then the second fixing hole 1512 is positioned, and the third fixing hole 1513 is positioned at the lowermost position.

The slide restricting portion 1924 is installed above the fixed operating portion 1922 and, as shown in FIG. 5A and FIG. 5C, includes a restricting portion body 1924a, a restricting projecting portion 1924b, and a restricting spring 1924c. Then, the slide restricting portion 1924 is installed by being guided by a second guide portion 1921b formed on the slide fixing body 1921.

The second guide portion 1921b is formed with a guide hole 1921c so as to oppose a restricting hole 1514 formed on the first fixed column 151. The restricting projecting portion 1924b is formed into a prism shape having a tapered portion T directed downward. Then, the tapered portion T of the restricting projecting portion 1924b is installed in the second guide portion 1921b in a form of being inserted into the guide hole 1921c, and the restricting spring 1924c is stored between the restricting projecting portion 1924b and the restricting portion body 1924a. The restricting portion body 1924a is fixed to the slide fixing body 1921.

As shown in FIG. 5A and FIG. 5B, when the fixed operating portion 1922 (fixed projecting portion 1922b) is fitted into the first fixing hole 1511 located at a topmost position, the tapered portion T of the restricting projecting portion 1924b of the slide restricting portion 1924 passes through the guide hole 1921c and is inserted into the restricting hole 1514. The slide restricting portion 1924 restrains the portion 192 for fixing the arm to the fixed column from being slid upward by operating the fixed operating portion 1922 (disables an upward sliding movement). However, as described later, a downward sliding movement is allowed.

The portion 191 for causing the arm to slide along the fixed column which constitutes the arm sliding unit 19 is fitted on the fixed column 15 (first fixed column 151) above the portion 192 for fixing the arm to the fixed column as shown in FIG. 2 and FIG. 3, and is supported so as to be slidable along the first fixed column 151. Then, the portion 191 for causing the arm to slide along the fixed column includes a cylindrical sliding body 1911 fitted on the first fixed column 151, and a pair of sliding and pivotally supporting portions 1912 formed in such a manner that two each of rectangular shapes project in a direction substantially parallel to the surface of the screen body 12 with the intermediary of the substantially center axis of the portion 191 for causing the arm to slide along the fixed column.

The portion 191 for causing the arm to slide along the fixed column pivotally supports the arm member 161 via the pivotal shaft 1913 lying substantially orthogonally to the screen body 12 in a state in which the other end portion of the intersecting arm member 161 of the first pantograph mechanism 16 is clamped between the two sliding and pivotally supporting portions 1912 from among the two each sliding and pivotally supporting portions 1912. In the same manner the arm member 171 is pivotally supported via the pivotal shaft 1913 lying substantially orthogonally to the screen body 12 in a state in which the other end of the intersecting arm member 171 of the second pantograph mechanism 17 is clamped between the other two sliding and pivotally supporting portions 1912.

Here, an operation for causing the portion 192 for fixing the arm to the fixed column to slide and an action of the portion 191 for causing the arm to slide along the fixed column will be described.

When causing the portion 192 for fixing the arm to the fixed column to slide, in a state shown in FIG. 5A for example, an action to push the projecting fixed operating portion 1922 installed above the slide gripping portion 1923 toward the fixed column 15 while gripping the slide gripping portion 1923 is performed. In association with this action, a pair of fixing springs 1922c formed as compression coil springs are compressed and the fixed projecting portion 1922b fitted in the first fixing hole 1511 is moved toward the screen body 12 and hence is disengaged from the first fixing hole 1511. After having brought into such a state, the portion 192 for fixing the arm to the fixed column is slid (slid downward in this case) with respect to the fixed column 15.

In FIG. 5A, when the fixed projecting portion 1922b is brought into a state of coming apart from the first fixing hole 1511 and starts sliding, the above-described restricting projecting portion 1924b of the slide restricting portion 1924 must be disengaged from the restricting hole 1514. In order to do so, the user slides the slide gripping portion 1923 while applying a slight force downward in a state of gripping the same. With this operation, in the slide restricting portion 1924, the tapered portion T of the restricting projecting portion 1924b slides on the outer peripheral portion of the restricting hole 1514, compresses the restricting spring 1924c formed as the compression coil spring, and moves toward the restricting portion body 1924a. Accordingly, the restricting projecting portion 1924b is disengaged from being inserted into the restricting hole 1514. After having assumed this state, the user is able to slide the slide gripping portion 1923 freely downward along the fixed column 15 in a state of gripping the same.

In a state of sliding the portion 192 for fixing the arm to the fixed column along the fixed column 15 as shown in FIG. 5C, the fixed projecting portion 1922b of the fixed operating portion 1922 slides along the side surface of the first fixed column 151 in a state of compressing the fixing spring 1922c. In this state, the fixed projecting portion 1922b slides while pressing the side surface of the first fixed column 151 all the time. The restricting projecting portion 1924b of the slide restricting portion 1924 slides on the side surface of the first fixed column 151 in a state of compressing the restricting spring 1924c.

When the portion 192 for fixing the arm to the fixed column is slid and the fixed projecting portion 1922b of the fixed operating portion 1922 is positioned in the second fixing hole 1512 formed on the first fixed column 151, the fixed projecting portion 1922b is fitted into the second fixing hole 1512 by a force of the compressed fixing spring 1922c. With this action, the portion 192 for fixing the arm to the fixed column is fixed to the first fixed column 151.

When the portion 192 for fixing the arm to the fixed column is slid along the fixed column 15, the portion 191 for causing the arm to slide along the fixed column located above the portion 192 for fixing the arm to the fixed column slides along the first fixed column 151 so as to follow the sliding movement of the portion 192 for fixing the arm to the fixed column by the action of the coil spring 142 as the urging member and the own weight of the portion 191 for causing the arm to slide along the fixed column. Therefore, when the portion 191 for causing the arm to slide along the fixed column slides so as to follow the sliding movement of the portion 192 for fixing the arm to the fixed column, and is fixed at the position of the second fixing hole 1512 by the portion 192 for fixing the arm to the fixed column, the portion 191 for causing the arm to slide along the fixed column comes into abutment with the upper end surface 1921d of the fixed portion 192 for fixing the arm to the fixed column and stops the further downward sliding movement.

When the portion 191 for causing the arm to slide along the fixed column is slid downward, the arm members 161 and 171 pivotally supported by the sliding and pivotally supporting portion 1912 of the portion 191 for causing the arm to slide along the fixed column rotate about the pivotal shaft 1913 and slide downward. With this action, the first pantograph mechanism 16 and the second pantograph mechanism 17 move so as to expand in the lateral direction.

The detailed action of the first pantograph mechanism 16 and the second pantograph mechanism 17 in this case will be described.

Due to the action of the coil spring 142 or the own weight of the portion 191 for causing the arm to slide along the fixed column, when the portion 191 for causing the arm to slide along the fixed column is slid downward, the arm members 161 and 171 pivotally supported by the sliding and pivotally supporting portion 1912 of the portion 191 for causing the arm to slide along the fixed column rotate about the pivotal shaft 1913 and slide downward. Simultaneously, the arm members 163 and 173 which are pivotally supported by the arm fixing and pivotally supporting portions 182 of the arm fixing unit 18 rotate about the pivotal shaft 1821. Simultaneously, the main body 1451 of the sliding member 145 of the second supporting unit of the second supporting unit 14 which is rotatably connected to the arm member 172 of the second pantograph mechanism 17 also slides downward. In association with this action, the main body 1351 of the sliding member 135 of the first supporting unit of the first supporting unit 13 which is rotatably connected to the arm member 162 of the first pantograph mechanism 16 also slides downward. The arm members 171 to 174 which constitute the second pantograph mechanism 17 rotate respectively about the pivotal shafts 1712, 1713, 1724, 1734, and 1442. In the same manner, the arm members 161 to 164 which constitute the first pantograph mechanism 16 rotate respectively about the pivotal shafts 1612, 1613, 1624, 1634, and 1342.

By the movement of the first pantograph mechanism 16 and the second pantograph mechanism 17 expanding in the lateral direction, the first supporting unit 13 and the second supporting unit 14, which are connected by the first pantograph mechanism 16 and the second pantograph mechanism 17 move away from each other in the lateral direction. Then, by the movement of the first supporting unit 13 and the second supporting unit 14 to move away from each other in the lateral direction, the screen body 12 extended between the first supporting unit 13 and the second supporting unit 14 is deployed in the lateral direction. The portion 191 for causing the arm to slide along the fixed column comes into abutment with the upper end surface 1921d of the fixed portion 192 for fixing the arm to the fixed column at the position of the second fixing hole 1512, so as to stop the deployment of the screen body 12.

In the same manner as the action as described above, fixation of the portion 192 for fixing the arm to the fixed column is achieved by sliding the portion 192 for fixing the arm to the fixed column downward along the fixed column 15 to cause the fixed projecting portion 1922b to be fitted into the third fixing hole 1513. Then, in association with the downward sliding movement of the portion 192 for fixing the arm to the fixed column, the portion 191 for causing the arm to slide along the fixed column moves to cause the first pantograph mechanism 16 and the second pantograph mechanism 17 to be expanded in the lateral direction, so that the screen body 12 is further deployed. Then, the portion 191 for causing the arm to slide along the fixed column comes into abutment with the upper end surface 1921d of the fixed portion 192 for fixing the arm to the fixed column at the position of the third fixing hole 1513, so as to stop the deployment of the screen body 12.

Fixation of the portion 192 for fixing the arm to the fixed column to the second fixing hole 1512 and the first fixing hole 1511 may be achieved by sliding the portion 192 for fixing the arm to the fixed column reversely upward along the fixed column 15. In this case, the portion 191 for causing the arm to slide along the fixed column slides while being pressed by the upward sliding movement of the portion 192 for fixing the arm to the fixed column in a state of being in abutment with the upper end surface 1921d of the portion 192 for fixing the arm to the fixed column.

By the upward sliding movement of the portion 191 for causing the arm to slide along the fixed column in association with the upward sliding movement of the portion 192 for fixing the arm to the fixed column, the arm members 161, 171 which are pivotally supported by the sliding and pivotally supporting portion 1912 of the portion 191 for causing the arm to slide along the fixed column slide upward while rotating about the pivotal shaft 1913. With this action, the first pantograph mechanism 16 and the second pantograph mechanism 17 move so as to be contracted toward the center (toward the fixed column 15).

By the movement of the first pantograph mechanism 16 and the second pantograph mechanism 17 contracting toward the fixed column 15, the first supporting unit 13 and the second supporting unit 14 which are connected by the first pantograph mechanism 16 and the second pantograph mechanism 17 move toward each other. Then, by the movement of the first supporting unit 13 and the second supporting unit 14 toward each other, the screen body 12 extended between the first supporting unit 13 and the second supporting unit 14 moves in the direction to reduce the deployment. The portion 191 for causing the arm to slide along the fixed column stops reduction of deployment of the screen body 12 when the portion 192 for fixing the arm to the fixed column is fixed at positions of the second fixing hole 1512 and the first fixing hole 1511.

The upward sliding movement of the portion 191 for causing the arm to slide along the fixed column is actually achieved by the user gripping the gripping portion 155 and the slide gripping portion 1923 and sliding the slide gripping portion 1923 (the portion 192 for fixing the arm to the fixed column) upward, so that the portion 191 for causing the arm to slide along the fixed column is pressed by the portion 192 for fixing the arm to the fixed column and hence slides upward. When the portion 192 for fixing the arm to the fixed column is fixed to the first fixing hole 1511, the further upward sliding movement is restrained by the restricting projecting portion 1924b of the slide restricting portion 1924 in the state of being inserted in the restricting hole 1514, and this state is maintained.

Figure 6A:
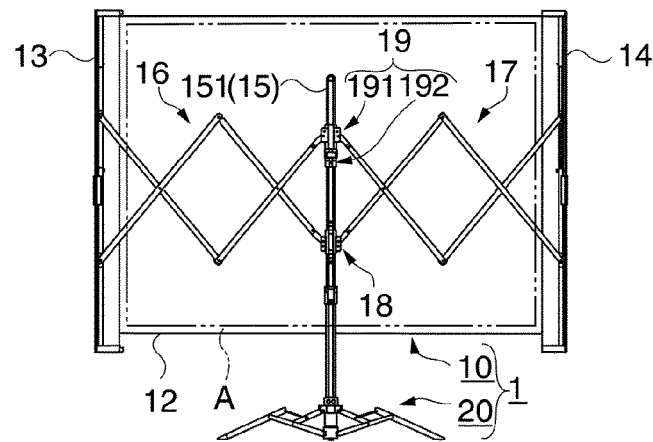
FIG. 6A is a drawing showing a portion for fixing the arm to the fixed column fixes an arm sliding unit at predetermined positions of the fixed column in a state being fixed at a position in which a projecting area assumes an aspect ratio of about "4:3".
Figure 6B:
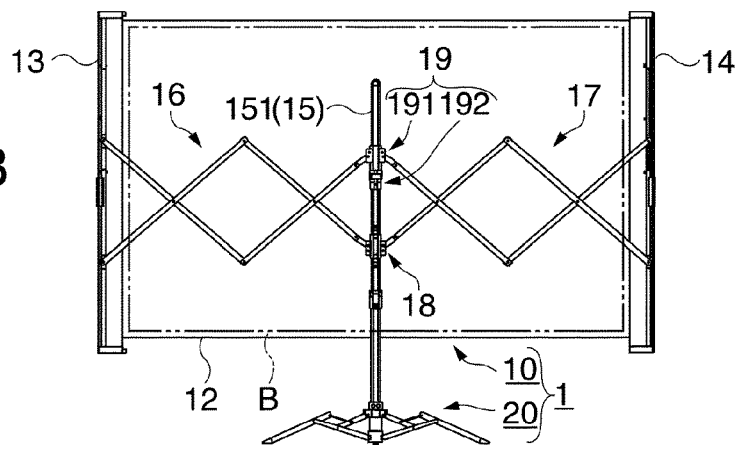
FIG. 6B is a drawing showing a portion for fixing the arm to the fixed column fixes the arm sliding unit at predetermined positions of the fixed column in a state being fixed at a position in which the projecting area assumes the aspect ratio of about "16:10".
Figure 6C:
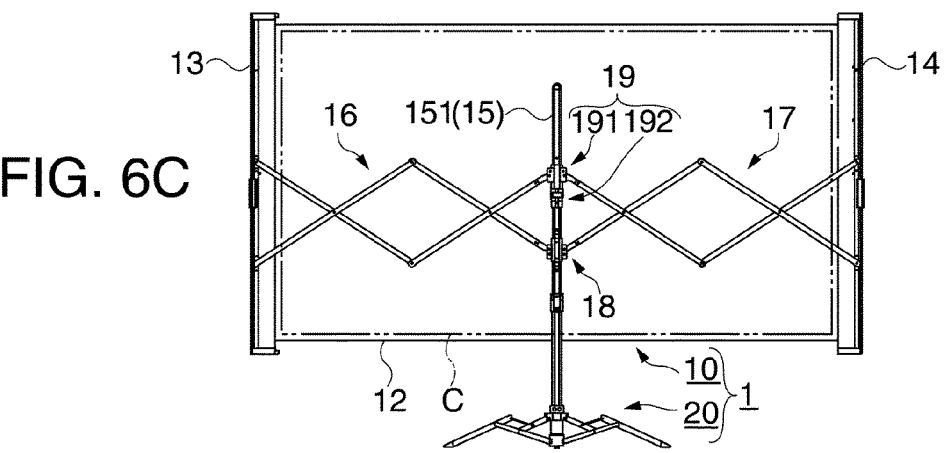
FIG. 6C is a drawing showing a portion for fixing the arm to the fixed column fixes the arm sliding unit at predetermined positions of the fixed column in a state being fixed at a position in which the projecting area assumes the aspect ratio of about "16:9".

FIGS. 6A to 6C are drawings showing a state in which the portion for fixing the arm to the fixed column fixes an arm sliding unit at predetermined positions of the fixed column. FIG. 6A is a drawing showing a state being fixed at a position in which the projecting area assumes an aspect ratio of about "4:3". FIG. 6B is a drawing showing a state being fixed at a position in which the projecting area assumes an aspect ratio of about "16:10". FIG. 6C is a drawing showing a state being fixed at a position in which the projecting area assumes an aspect ratio of about "16:9". Referring to FIGS. 6A to 6C, the projecting area secured by the screen body 12 by the fixation of the arm sliding unit 19 will be described.

As shown in FIG. 6A, when the portion 192 for fixing the arm to the fixed column (arm sliding unit 19) is fixed to a position of the first fixing hole 1511 (see FIG. 5A) as a predetermined position, an area having an aspect ratio of about "4:3" is secured as a projecting area A of the image light formed on the front side of the screen body 12 to which the image light enters as indicated by a double-dashed chain line.

Subsequently, from this state, the user operates the fixed operating portion 1922 while gripping the gripping portion 155 and the slide gripping portion 1923 to slide the slide gripping portion 1923 (portion 192 for fixing the arm to the fixed column) downward. Then, when the portion 192 for fixing the arm to the fixed column is fixed at a position of the second fixing hole 1512 (see FIG. 5A) as a predetermined position, an area having an aspect ratio of about "16:10" is secured as a projecting area B of the image light as indicated by double-dashed chain line in FIG. 6B.

Then, in the same manner, when the portion 192 for fixing the arm to the fixed column is fixed at a position of the third fixing hole 1513 (see FIG. 5A) as a predetermined position, an area having an aspect ratio of about "16:9" is secured as a projecting area C of the image light as indicated by double-dashed chain line in FIG. 6C. In this manner, in the first embodiment, the aspect ratios of the projecting areas A, B, and C formed on the screen body 12 correspond to the three aspect ratios of the image light.

Figure 7:
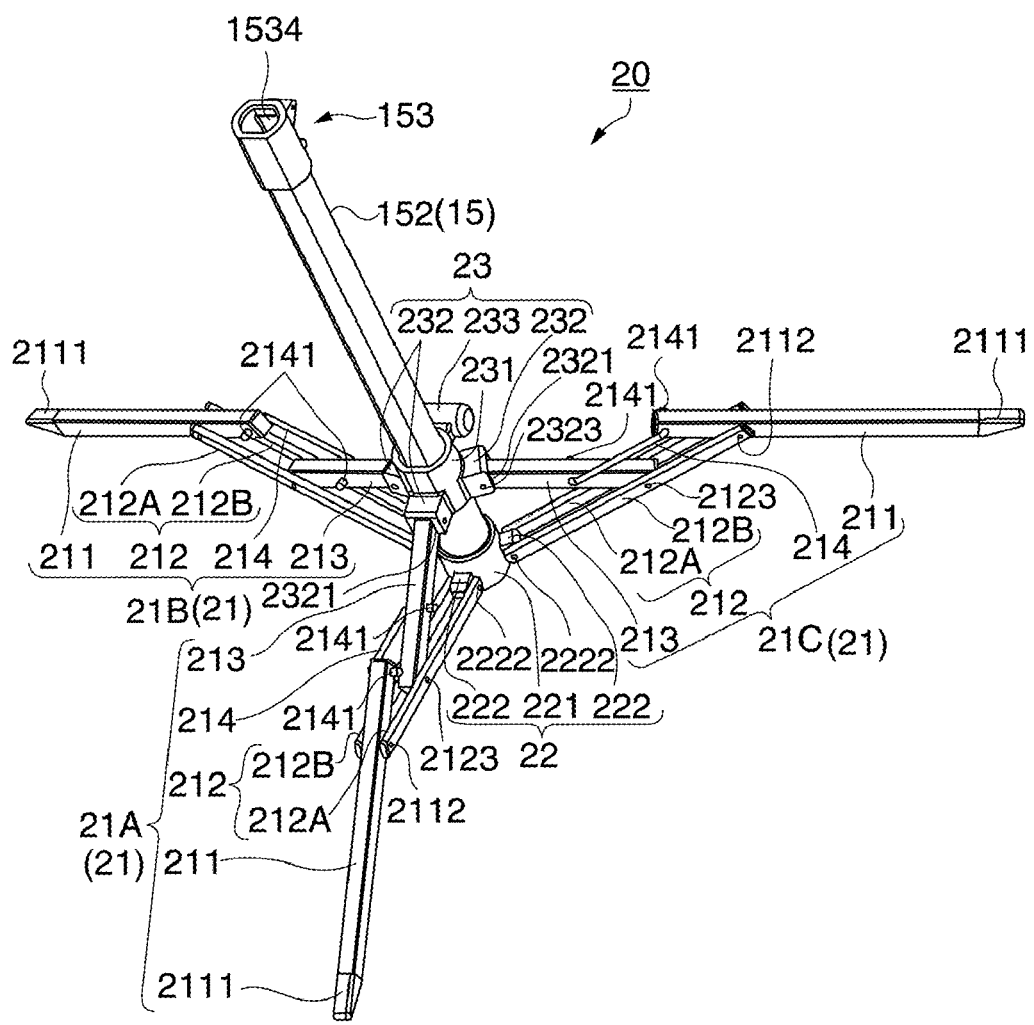
FIG. 7 is a perspective view showing the schematic configuration of a supporting leg.

FIG. 7 is a perspective view showing a schematic configuration of a supporting leg. FIG. 7 is a perspective view of the supporting leg 20 viewed from the front side of the screen 1. FIG. 7 shows a state in which legs 21 of the supporting leg 20 are moved apart (deployed) from the fixed column 15 to the maximum. Referring now to FIG. 7, the configuration of the supporting leg 20 will be described.

The supporting leg 20 is a portion for supporting the image projecting portion 10 and, in the first embodiment, includes fixed column 15 (second fixed column 152), three legs 21, a leg fixing unit 22, and a leg sliding unit 23.

The second fixed column 152 is formed of a hollow column-shaped member extending in the vertical direction and having a substantially track shape in horizontal cross-section. The second fixed column 152 and the first fixed column 151 constitute the fixed column 15. Then, after having inserted the first fixed column 151 from the upper end portion of the second fixed column 152 and adjusted the length of extension of the first fixed column 151, the first fixed column 151 is fixed to the second fixed column 152 by the column fixing portion 153, so that the image projecting portion 10 is fixedly supported.

The legs 21 extend in three directions, and the respective legs 21 are configured by multi-level link mechanisms of the respective members as described later. As shown in FIG. 7, the respective legs 21 may be brought into a state of being apart (deployed) from the fixed column 15 (the second fixed column 152) to the maximum (this state is referred to as "opened state"). In this state, the legs 21 bring the second fixed column 152 upright, and support the image projecting portion 10 in an upright position. The opened state is a state of the legs 21 in the state in which the screen 1 is used.

Figure 8:
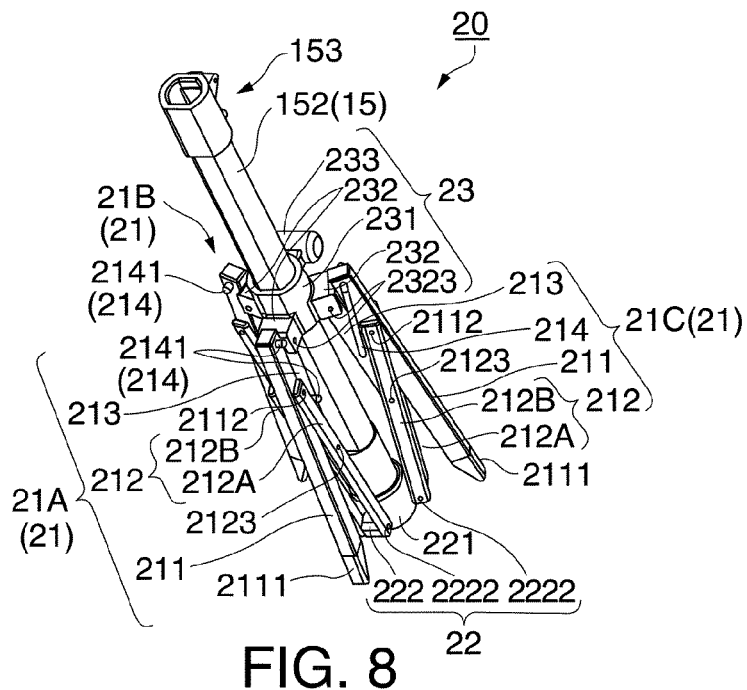
FIG. 8 is a perspective view showing the supporting leg in a closed state.

The respective legs 21 may be brought into a state of being closest (folded) to the fixed column 15 (the second fixed column 152) to the maximum (this state is referred to as "closed state", see FIG. 8). The closed state is a state of the legs 21 when being stored, and is a state of the legs 21 suitable for the screen 1 not in use (when carrying or being stored).

In the three legs 21, in the first embodiment, one of the legs 21 is deployed in the substantially vertical to the screen body 12 on the front side of the screen 1. This leg 21 is referred to as a leg 21A. Then, in the first embodiment, the two other legs 21 are deployed on the back side of the screen 1 by being deployed in the direction rotated by about 120° with respect to the leg 21A about the fixed column 15. These two legs 21 are referred to as legs 21B and 21C.

The leg fixing unit 22 is a member for pivotally supporting the three legs 21 and fixing the same to the second fixed column 152. The leg sliding unit 23 is a member supported so as to be slidable along the second fixed column 152 for pivotally supporting the three legs 21. The leg sliding unit 23 slides along the second fixed column 152 toward and away from the leg fixing unit 22, so that the three legs 21 configured by the multi-level link mechanisms move in association with it, so that the legs 21 are moved toward (folded) or away (deployed) from each other.

The three legs 21 include a first leg member 211, a second leg member 212, a third leg member 213, and a leg restricting member 214. The three legs 21 have the same members and are configured in the same manner, one of the legs 21 (leg 21A) will be mainly described.

Figure 9:
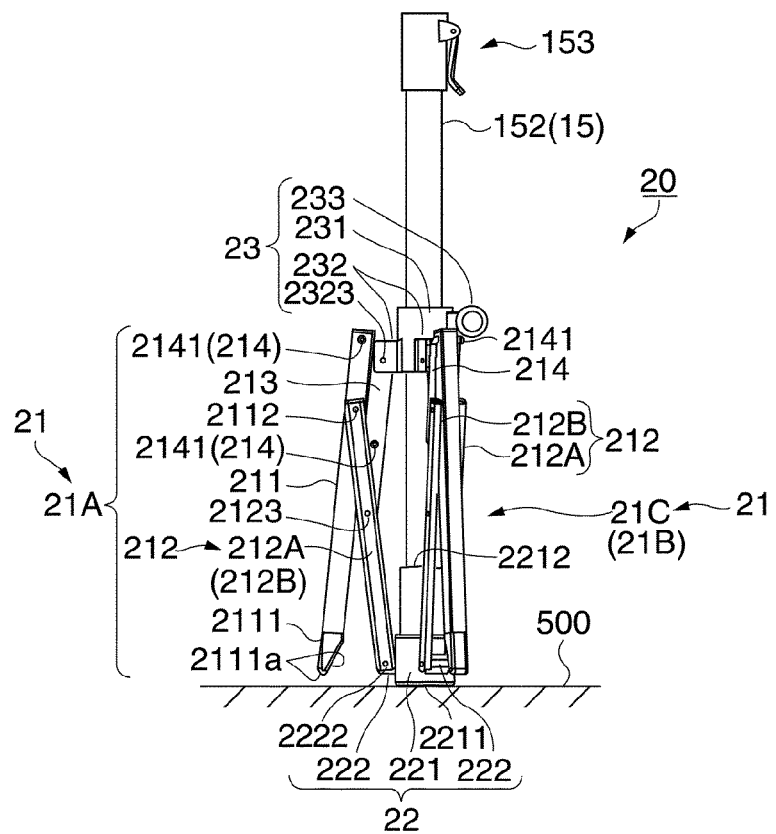
FIG. 9 is a plan view of the supporting leg in the closed state when viewed from the left.

The first leg member 211 is formed of a hollow column shaped square rod member, and includes at one of the end portions thereof an abutting portion 2111 which is formed of synthetic resin member having a high abrasion resistance and not scratching the surface of installation and coming into abutment with a surface of installation 500 (see FIG. 9).

The second leg member 212 includes second leg member pair 212A and 212B formed of the hollow column shaped square rod shaped member into the same shape. The second leg member pair 212A and 212B are installed in parallel to each other as shown in FIG. 7, and end portions of them on one side pivotally support and connect the first leg member 211 via a common pivotal shaft 2112 in a state of clamping the side surfaces of the other end portion of the first leg member 211. The other end portions of the second leg member pair 212A and 212B are pivotally supported by the leg fixing unit 22, descried later, and are connected thereto as shown in FIG. 7.

The third leg portion 213 is formed of a hollow column shaped square rod shape member and, as shown in FIG. 7, one end portion thereof pivotally supports and connects the second leg member 212 by a common pivotal shaft 2123 in a state in which one end portion is clamped by a substantially middle portion of the second leg member 212 (the second leg member pair 212A and 212B). As shown in FIG. 7, the other end portion of third leg portion 213 is pivotally supported by the leg sliding unit 23, described later, and is connected thereto.

The leg restricting member 214 is formed of a round metal rod member and, as shown in FIG. 7, includes connecting portions 2141 at both ends thereof by being bent substantially vertically in the same direction. As shown in FIG. 7, the connecting portion 2141 at one end of the leg restricting member 214 is inserted into a connecting hole formed on the other end of the first leg member 211, and pivotally supports the first leg member 211 and is connected thereto with the inserted connecting portions 2141 as a pivotal shaft. Then, as shown in FIG. 7, the connecting portion 2141 at the other end of the leg restricting member 214 is inserted into a connecting hole formed at substantially middle portion of the third leg portion 213, and pivotally supports third leg portion 213 and is connected thereto with the inserted connecting portions 2141 as a pivotal shaft.

As shown in FIG. 7, the leg fixing unit 22 is formed so as to extend into a two leveled cylindrical shape, and includes a leg fixing unit body 221 in the interior thereof for allowing the insertion of the lower end portion of the second fixed column 152 and fixing the same. The leg fixing unit 22 has leg fixing and pivotally supporting portions 222 formed so as to project in the direction of normal lines in predetermined three directions from a cylindrical side surface of the leg fixing unit body 221 on the side of the lower end portion thereof. In the first embodiment, the predetermined three directions are the same directions as those in which the legs 21 (21A, 21B, and 21C) are deployed respectively. Then, the leg fixing and pivotally supporting portions 222 of the leg fixing unit 22 pivotally supports the second leg member 212 and is connected thereto by a common pivotal shaft 2222 in a state of being clamped by the other end portions of the second leg member 212 (second leg member pair 212A and 212B) as shown in FIG. 7.

As shown in FIG. 7, the leg sliding unit 23 includes a leg sliding member body 231 extending in a cylindrical shape and allowing insertion of the second fixed column 152 so as to be slidable along the second fixed column 152. The leg sliding unit 23 also includes leg slide member pivotally supporting portion 232 formed on the outer side surface of the leg sliding member body 231 so as to project in the same directions as the three directions of the leg fixing and pivotally supporting portions 222 formed on the leg fixing unit 22. As shown in FIG. 7, the leg sliding unit 23 includes a gripping portion 233 formed into a cylindrical shape and extending in the direction substantially orthogonally to the direction of extension of the second fixed column 152 and also in the horizontal direction (lateral direction of the screen 1) on the upper side of the outer side surface of the leg sliding member body 231 at a portion opposite from the side of the screen body 12.

The leg slide member pivotally supporting portion 232 has a guide groove 2321 formed by notching the side surface on the distal end side and having a recess depressed downward from the upper side. Then, as shown in FIG. 7, the leg slide member pivotally supporting portion 232 pivotally supports the third leg member 213 and connects the same by a common pivotal shaft 2323 in a state in which the other end portion of the third leg member 213 is guided into the interior of the guide groove 2321.

Figure 10:
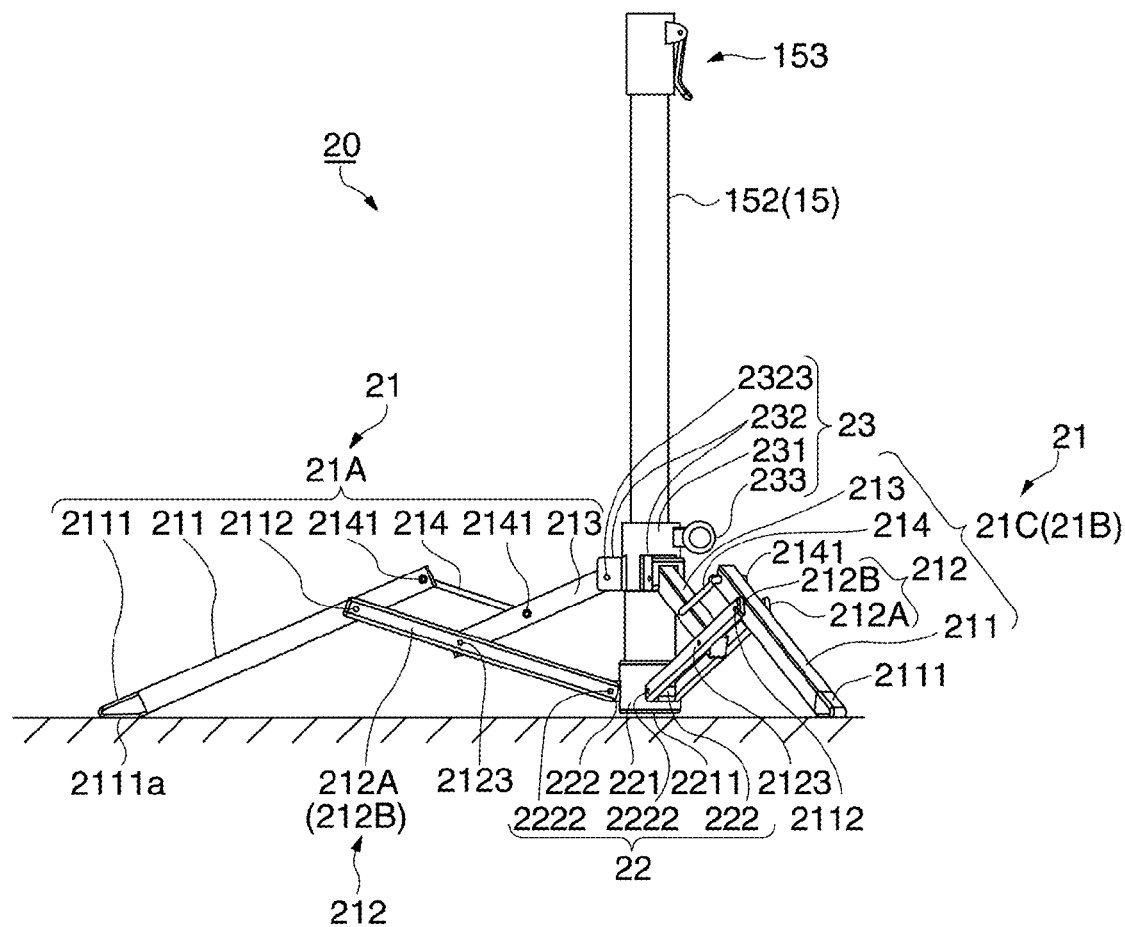
FIG. 10 is a plan view of the supporting leg in an opened state when viewed from the left.

FIG. 8 is a perspective view showing a supporting leg in a closed state. FIG. 9 is a plan view of the supporting leg in the closed state when viewed from the left. FIG. 10 is a plan view of the supporting leg in an opened state when viewed from the left. FIG. 8 is a perspective view of the supporting leg 20 when viewed from the front side of the screen 1. FIG. 9 is a drawing of the supporting leg 20 in the closed state shown in FIG. 8 when viewed from the left. FIG. 10 is a plan view of the supporting leg 20 in the opened state shown in FIG. 7 when viewed from the left. FIG. 9 and FIG. 10 also show a method of installing the supporting leg 20 on the surface of installation 500 such as a floor surface.

In FIG. 7 to FIG. 10, the image projecting portion 10 is not shown. However, in the first embodiment, the image projecting portion 10 is installed on the first fixed column 151 inserted into the second fixed column 152 so as to be capable of sliding but not capable of being disconnected. In the first embodiment, since the image projecting portion 10 which constitutes the screen 1 and the supporting leg 20 are formed integrally, the image projecting portion 10 and supporting leg 20 are not separable as separated members.

Referring now to FIG. 7 to FIG. 10, an action to deploy and fold the supporting leg 20 will be described. Since the three legs 21 are configured in the same manner and act in the same manner, one of the legs 21 (leg 21A) will be mainly described.

When deploying the legs 21 of the supporting leg 20, as shown in FIG. 9, the user firstly brings the screen 1 in a closed state in which the screen body 12 of the image projecting portion 10 is closed and the legs 21 of the supporting leg 20 are also closed into a state in which a lower end surface 2211 of the leg fixing unit 22 is in abutment with the surface of installation 500 with the supporting leg 20 placed on the lower side. When the legs 21 of the supporting leg 20 is in the closed state, in the first embodiment, the lower end surface 2211 as the end surface of the leg fixing unit 22 is projected with respect to an end surface 2111a of the abutting portion 2111 as one end portion of the first leg member 211 as shown in FIG. 9. Therefore, when the screen 1 (supporting leg 20) is brought into abutment with the surface of installation 500 substantially vertically, the lower end surface 2211 of the leg fixing unit 22 comes into abutment with the surface of installation 500, and the end surface 2111a of the first leg member 211 assumes a state apart (raised) from the surface of installation 500.

In this state, the user grips the gripping portion 233 of the leg sliding unit 23 while supporting the image projecting portion 10, and presses the same downward (toward the surface of installation 500) with a force. In association with this operation, the leg sliding unit 23 starts sliding downward. In association with this action, the third leg portion 213 pivotally supported by the leg slide member pivotally supporting portion 232 slides downward, and rotates about the pivotal shaft 2323. The third leg portion 213 of the leg 21A shown in FIG. 9 rotates clockwise about the pivotal shaft 2323.

In association with the downward sliding movement of the third leg portion 213 and the rotation thereof about the pivotal shaft 2323, the second leg member 212 rotatably connected to the third leg portion 213 and the pivotal shaft 2123 rotates about the pivotal shaft 2123. Simultaneously, the second leg member 212 rotates about the pivotal shaft 2222 of the leg fixing and pivotally supporting portions 222. The second leg member 212 of the leg 21A shown in FIG. 9 rotates counterclockwise about the pivotal shaft 2222.

Since the leg restricting member 214 rotatably connects the third leg portion 213 and the other end portion of the first leg member 211 by the connecting portions 2141, the second leg member 212 rotates about the pivotal shaft 2222, and hence the first leg member 211 rotatably connected to the second leg member 212 rotates about the pivotal shaft 2112 while being restrained by the leg restricting member 214. The first leg member 211 of the leg 21A shown in FIG. 9 rotates clockwise about the pivotal shaft 2112 while being restrained by the leg restricting member 214.

The above-described action is a series of actions of the legs 21 in the course in which the user slides the leg sliding unit 23 downward by pressing the gripping portion 233 downward. When the leg sliding unit 23 is slid downward, the three legs 21 (21A, 21B, and 21C) which connect the leg sliding unit 23 perform the actions described above substantially simultaneously, so that the multi-level link mechanisms act in the directions of deployment of the legs 21. Consequently, as shown in FIG. 10, the leg 21A is deployed in the substantially vertical direction with respect to the screen body 12 on the front side of the screen 1. Other legs 21B and 21C are also deployed in the respective directions.

FIG. 10 shows an opened state in which the legs 21 are opened to the maximum as described above. In this case, the end surface 2111a of the abutting portion 2111 which is formed on the distal end of the first leg member 211 comes into abutment with the surface of installation 500. In this state (opened state), the lower end surface 2211 of the leg fixing unit 22 assumes a state of being slightly apart from the surface of installation 500.

When deployment of the legs 21 is started from the closed state and the distal end portion of the end surface 2111a of the abutting portion 2111 comes into abutment with the surface of installation 500, the user rifts the fixed column 15, and presses the gripping portion 233 of the leg sliding unit 23 downward so that the lower end surface 2211 of the leg fixing unit 22 assumes a state of being slightly apart from the surface of installation 500 (a state shown in FIG. 10).

In the opened state, the leg sliding unit 23 comes into abutment with an upper end surface 2212 (see FIG. 9) of the leg fixing unit body 221 of the leg fixing unit 22. In other words, the legs 21 is brought into the opened state by sliding the leg sliding unit 23 until it comes into abutment with the upper end surface 2212 of the leg fixing unit body 221. With the series of actions described above, the legs 21 are deployed completely and assume a braced state by the multi-level link mechanisms as shown in FIG. 7 and FIG. 10, so that a stable fixation on the surface of installation 500 is achieved.

The legs 21 from the opened state as shown in FIG. 7 and FIG. 10 into the closed state shown in FIG. 8 and FIG. 9. More specifically, the user grips the gripping portion 233 of the leg sliding unit 23 and slides the leg sliding unit 23 upward along the second fixed column 152 by applying an upward force thereto, the multi-level link mechanisms of the legs 21, so that the closed state is achieved.

FIGS. 11A and 11B are perspective views showing the screen in a state in which the screen body is closed. FIG. 11A is a perspective view in which the legs are in a closed state, and FIG. 11B is a perspective view in which the legs are in an opened state. FIG. 11A shows a state in which the legs 21 are stored, which is a state suitable for the cases of carrying or storing the screen 1. FIG. 11B is a state in which the legs 21 is brought into an opened state when using the screen 1 and before deploying the screen body 12. FIGS. 11A and 11B show the screen 1 viewed from the back side like the drawing shown in FIG. 2.

The screen 1 is configured in such a manner that when the user grips the first gripping member 133 and the second gripping member 143 and presses the same toward the fixed column 15 in the image projecting portion 10, the first pantograph mechanism 16 and the second pantograph mechanism 17 are moved so as to be contracted while winding the screen body 12 on the spring roll 132. Then, as shown in FIG. 11A, the opposing side surfaces of the first supporting unit 13 and the second supporting unit 14 are brought into abutment with each other. The opposed side surfaces of the first supporting unit 13 and the second supporting unit 14 in the first embodiment correspond to an outer surface of the first supporting housing 131 in the periphery of a portion where the opening 1311 (see FIG. 2) of the first supporting unit 13 is formed and an outer surface of the second supporting housing 141 in the periphery of a portion where the opening 1411 (see FIG. 1) of the second supporting unit 14 is formed.

Figure 12:
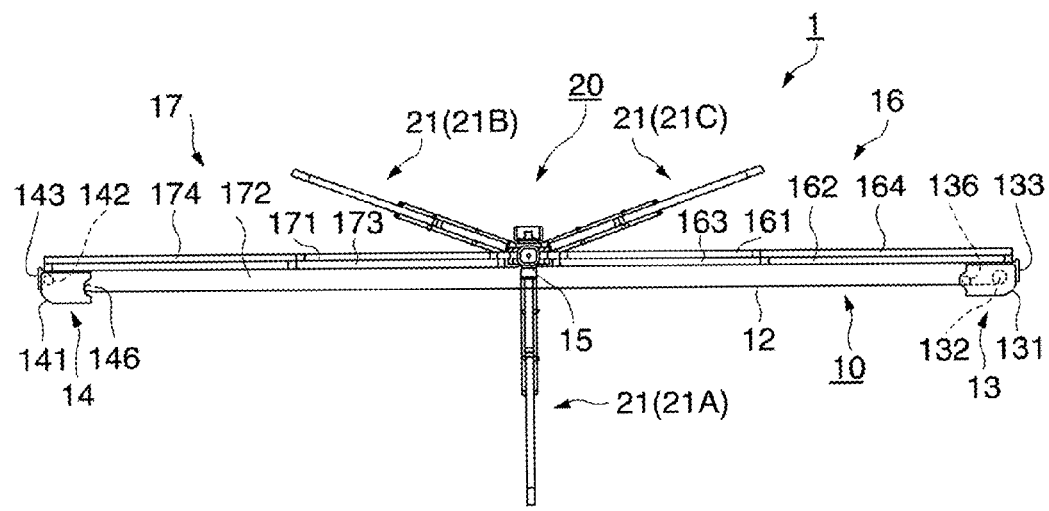
FIG. 12 is a plan view of a case when the screen is viewed from above.

In the first supporting portion 13, provided on an upper portion and a lower portion of the opening 1311 of the first supporting housing 131 are fixing projections 136 as shown in FIG. 2 or FIG. 12 described later. In the second supporting unit 14, provided on the upper portion and the lower portion of the opening 1411 of the second supporting housing 141 are fixing recesses 146 as shown in FIG. 1 or FIG. 12 described later. When the opposed side surfaces of the first supporting unit 13 and the second supporting unit 14 are brought into abutment with each other, the fixing projections 136 of the first supporting unit 13 and the fixing recess 146 of the second supporting unit 14 are engaged with each other, so that the first supporting unit 13 and the second supporting unit 14 are fixed. In order to fix the first supporting unit 13 and the second supporting unit 14 as described above, magnetic members or the like may be used for fixation.

As described above, in a state in which the opposed side surfaces of the first supporting unit 13 and the second supporting unit 14 are brought into abutment with each other and fixed, the first pantograph mechanism 16 and the second pantograph mechanism 17 having the fixed column 15 in-between are folded on the back side of the first supporting unit 13 and the second supporting unit 14 in the lateral direction of the fixed column 15, and are stored compactly. In the first embodiment, the first pantograph mechanism 16 and the second pantograph mechanism 17 are installed in proximity to the first supporting unit 13 and the second supporting unit 14 on the back sides thereof in order to minimize the distance from the screen body 12. In this state, in the image projecting portion 10, the portion 191 for causing the arm to slide along the fixed column and the portion 192 for fixing the arm to the fixed column which constitute the arm sliding unit 19 are apart from each other.

As shown in FIG. 11A, by pressing the gripping portion 233 upward, and sliding the leg sliding unit 23 upward the legs 21 are folded and hence the supporting leg 20 is brought into a closed state, whereby a compactly stored state around the second fixed column 152 as a center is assumed. The user is able to hold and move (carry) the screen 1 in the state in which the image projecting portion 10 and the supporting leg 20 are compactly stored. Also, the screen 1 in this state may be stored without occupying a large storage space.

As shown in FIG. 11B, when the user brings the legs 21 of the supporting leg 20 into the opened state first for using the screen 1, since the legs 21 have the multi-level link mechanisms, the leg sliding unit 23 may be deployed widely with a smaller sliding amount in comparison with the legs having no multi-level link mechanism in the related art. After having brought the legs 21 of the supporting leg 20 into the opened state, the image projecting portion 10 is deployed as described above.

FIG. 12 is a plan view of a case when the screen is viewed from above. FIG. 12 is a plan view in the state in which the screen 1 is in use in which the first supporting unit 13 and the second supporting unit 14 of the image projecting portion 10 are in the deployed state, and the legs 21 of the supporting leg 20 are also in the deployed state. In FIG. 12, the front side of the screen 1 where the image light is projected is the lower side in the drawing, and the back side of the screen 1 is the upper side in the drawing.

As shown in FIGS. 11A and 11B or FIG. 12, the screen 1 in the first embodiment has a two-section structure having the first pantograph mechanism 16 and the second pantograph mechanism 17 in the image projecting portion 10. Then, the first pantograph mechanism 16 and the second pantograph mechanism 17 extend in parallel to the screen body 12 at a minimum distance from the screen body 12 which is substantially the same as the fixed column 15, and are installed on the left and the right of the fixed column 15 at substantially the center. Then, by the first pantograph mechanism 16 and the second pantograph mechanism 17, the first supporting unit 13 and the second supporting unit 14 are fixed.

In this configuration, the first supporting unit 13, the second supporting unit 14, the first pantograph mechanism 16, and the second pantograph mechanism 17 are installed at the close proximity of the fixed column 15. In this configuration, the thickness reduction of the screen 1 from the front side to the back side (in the fore-and-aft direction of the screen 1) is achieved. The screen 1 has a center of weight balance in the fore-and-aft direction of the image projecting portion 10 at a position close to the fixed column 15. The spring roll 132 is arranged in the interior of the first supporting housing 131, and the coil spring 142 is arranged in the interior of the second supporting housing 141, so that a center of the weight balance in the lateral direction of the image projecting portion 10 is substantially matched with the fixed column 15.

The supporting leg 20 includes the legs 21 each employing the multi-level link mechanism. Then, the supporting leg 20 includes the leg 21A which is deployed on the front side of the screen 1 substantially vertically with respect to the screen body 12, and the two legs 21B and 21C deploying on the back side of the screen 1 by being deployed in the direction rotated by about 120° with respect to the leg 21A about the fixed column 15. With these three legs 21, the supporting leg 20 stably fixes the image projecting portion 10. The legs 21B and 21C arranged on the back side of the screen 1 are arranged which allow reduction of the distance between a wall and the image projecting portion 10 when the screen 1 is installed just in front of the wall.

According to the first embodiment as described above, the following effects are obtained.

(1) The screen 1 in the first embodiment has a two-section structure having the first pantograph mechanism 16 and the second pantograph mechanism 17, which are installed respectively between the first supporting unit 13 and the second supporting unit 14 about the fixed column 15 at the center. In this configuration, in comparison with the screen provided with the pantograph mechanism having the first pantograph mechanism and the second pantograph mechanism formed integrally with each other and held by the fixed column, the flexibility of the position of arrangement of the first pantograph mechanism 16 and the second pantograph mechanism 17 with respect to the screen body 12 and the fixed column 15 is increased. Therefore, the center of the weight balance of the screen 1 may be set in the direction of the column of the fixed column 15, so that the weight balance of the screen 1 is achieved. Also, making up for the weight balance by increasing the thickness of the fixed column as in the related art is not necessary, and hence the weight reduction of the screen 1 is achieved.

(2) According to the screen 1 in the first embodiment, the single arm fixing unit 18 is fixed to the fixed column 15, and pivotally supports the arm members 163 and 173, which are one of the arm members of each of the first pantograph mechanism 16 and the second pantograph mechanism 17 installed on the side of the fixed column 15. Then, the single arm sliding unit 19 is supported slidably along the fixed column 15 and slides thereon while pivotally supporting the arm members 161 and 171 which are the other one of the arm members of each of the first pantograph mechanism 16 and the second pantograph mechanism 17 installed on the side of the fixed column 15. In this configuration, in comparison with a case where the two sliding components are used for pivotally supporting the arm members 161 and 163, 171 and 173 of both the first pantograph mechanism 16 and the second pantograph mechanism 17 and configured to be slidable, the sliding component (arm sliding unit 19) is configured by a single unit, a compact configuration is achieved. Also, since the sliding component (arm sliding unit 19) is configured by a single unit and the arm members 167 and 173, which are one of the arm members of each of the first pantograph mechanism 16 and the second pantograph mechanism 17, are fixed and only the arm members 161 and 171, which are the other one of those, are allowed to slide, the first pantograph mechanism 16 and the second pantograph mechanism 17 are allowed to be expanded and contracted stably in comparison with a case where there are two units of the sliding components. Therefore, the first supporting unit 13 and the second supporting unit 14 are allowed to be moved toward and away from each other stably (the screen body 12 is stably opened and closed).

(3) According to the screen 1 in the first embodiment, the first supporting unit 13 includes the fixed portion 134 of the first supporting unit and the sliding member 135 of the first supporting unit, and the second supporting unit 14 includes the fixed portion 144 of the second supporting unit and the sliding member 145 of the second supporting unit. In this configuration, the first pantograph mechanism 16 and the second pantograph mechanism 17 expand and contract by sliding the arm sliding unit 19, and the screen body 12 is expanded and opened and closed by moving the first supporting unit 13 and the second supporting unit 14 toward and away from each other. In this manner, since the sliding components (the sliding member 135 of the first supporting unit and the sliding member 145 of the second supporting unit) are each configured as one unit, a compact configuration is achieved in comparison with the case in which a slidable configuration is achieved by pivotally supporting the corresponding arm members 162, 164, 172, and 174 using two each sliding components for the first supporting unit 13 and the second supporting unit 14. Also, since the sliding components (the sliding member 135 of the first supporting unit and the sliding member 145 of the second supporting unit) are each configured as one unit and the arm members 164 and 174, which are one of the arm members of each of the first pantograph mechanism 16 and the second pantograph mechanism 17, are fixed and only the arm members 162 and 172, which are the other one of those, are allows to slide, the first pantograph mechanism 16 and the second pantograph mechanism 17 are allowed to be expanded and contracted stably in comparison with a case where the each sliding component is configured with two components. Therefore, the screen body 12 are stably opened and closed.

(4) According to the screen 1 in the first embodiment, the first pantograph mechanism 16 and the second pantograph mechanism 17 are installed in parallel to the screen body 12 with the intermediary of the fixed column 15 at a narrow distance from the screen body 12. In this configuration, the first pantograph mechanism 16 and the second pantograph mechanism 17 may be installed in proximity to the screen body 12. Accordingly, the compact and thin configuration of the screen 1 is achieved. Then, the first pantograph mechanism 16 and the second pantograph mechanism 17 extend in parallel to the screen body 12 at a minimum distance from the screen body 12 which is substantially the same as the fixed column 15, and are installed on the left and the right of the fixed column 15 at substantially the center. In this configuration, by bringing the center of the weight balance of the screen 1 in the fore-and-aft direction close in the proximity to the fixed column 15, the weight balance of the screen 1 is well achieved by the fixed column 15 and hence upsizing of the fixed column 15 is not necessary, whereby the compact and light weight configuration of the screen 1 is achieved.

(5) According to the screen 1 in the first embodiment, the portion 192 for fixing the arm to the fixed column fixes the portion 191 for causing the arm to slide along the fixed column by being fixed on the predetermined positions formed on the fixed column 15 (the first fixing hole 1511, the second fixing hole 1512, and the third fixing hole 1513), so that the arm sliding unit 19 is fixed. Then, when being fixed to the respective positions, the projecting areas A, B, and C formed by the screen body 12 being deployed correspond to the aspect ratios of the image light to be projected. Accordingly, since the screen body 12 may be deployed, set, and fixed easily so as to secure the projecting areas A, B, or C corresponding to the aspect ratio that the user desires, convenience of the screen 1 is improved. Also, since the possibility of remaining of the margin on the vertical direction or the lateral direction of the screen body 12 is minimized by setting the projecting areas A, B, and C of the screen body 12 correspondingly to the aspect ratio of the image light, visual discomfort that the user feel may be reduced.

(6) According to the screen 1 in the first embodiment, the coil spring 142 as an urging member which urges the first supporting unit 13 and the second supporting unit 14 to move away from each other is included. Accordingly, a force to move the first supporting unit 13 and the second supporting unit 14 away from each other or a force to slide the arm sliding unit 19 required for the user to deploy the screen body 12 may be reduced.

(7) According to the screen 1 in the first embodiment, the spring roll 132 as the winding member for winding the screen body 12 is installed in the first supporting unit 13, and the coil spring 142 as the urging member is installed in the second supporting unit 14. Therefore, the center of the weight balance of the screen 1 in the lateral direction is substantially matched with the fixed column 15, so that the weight balance is easily achieved, and the inclination of the screen body 12 in the lateral direction is restrained.

(8) According to the screen 1 in the first embodiment, the coil spring 142 is installed in the interior of the second supporting housing 141 which constitutes the second supporting unit 14. Accordingly, when the user expands or contracts the first pantograph mechanism 16 and the second pantograph mechanism 17, smooth expansion or contraction is achieved without being interfered by the abutment of his or her finger.

(9) According to the screen 1 in the first embodiment, the urging member is configured by the coil spring 142, manufacture and assembly is facilitated. Since the coil spring 142 has a simple structure, the possibility of occurrence of malfunction is low, so that long term reliability is secured.

(10) According to the screen 1 in the first embodiment, the fixed column 15, and the plurality of arm members 161 to 164 and 171 to 174, which constitute the first pantograph mechanism 16 and the second pantograph mechanism 17 are formed of hollow column-shaped members. Therefore, the force of rigidity required for the fixed column 15 and the arm members 161 to 164 and 171 to 174 is secured. In addition, the possibility that the user's finger could be caught between the intersecting arm members 161 to 164 and 171 to 174 when expanding and contracting (specifically when folding) the first pantograph mechanism 16 and the second pantograph mechanism 17 is reduced in comparison with the case where the arm member is formed by punching the plate member, for example.

(11) According to the screen 1 in the first embodiment, the portion 191 for causing the arm to slide along the fixed column and the portion 192 for fixing the arm to the fixed column which constitute the arm sliding unit 19 are formed as separate members. Therefore, when sliding the arm sliding unit 19 and fixing the portion 192 for fixing the arm to the fixed column to the fixing hole (the first fixing hole 1511, the second fixing hole 1512, and the third fixing hole 1513), it is achieved only by sliding and fixing the portion 192 for fixing the arm to the fixed column at the beginning, and by a smaller operating force in comparison with the case of sliding and fixing integrally as a single unit, the operation is easy. Also, the portion 191 for causing the arm to slide along the fixed column slides along the fixed column 15 by its own weight and an urging force by the urging member after having fixed the portion 192 for fixing the arm to the fixed column, and comes into abutment with the portion 192 for fixing the arm to the fixed column, whereby the fixation is achieved. In this configuration, the operability of the arm sliding unit 19 is improved and the action to deploy the screen body 12 to a desired projecting area (projecting areas A, B, or C) is achieved easily.

(12) According to the screen 1 in the first embodiment, since the supporting leg 20 having the three legs 21 (21A, 21B, and 21C) is provided, the screen 1 may be supported upright in abutment with the surface of installation 500 stably.

(13) According to the screen 1 in the first embodiment, even though the image projecting portion 10 and the supporting leg 20 are integrated, since the weight reduction of the image projecting portion 10 and downsizing of the supporting leg 20 are achieved, portability of the screen 1 is improved. Also, it is not necessary to assemble the image projecting portion 10 to the supporting leg 20, so that the improved convenience of the screen 1 is achieved.

Second Embodiment

Figure 13:
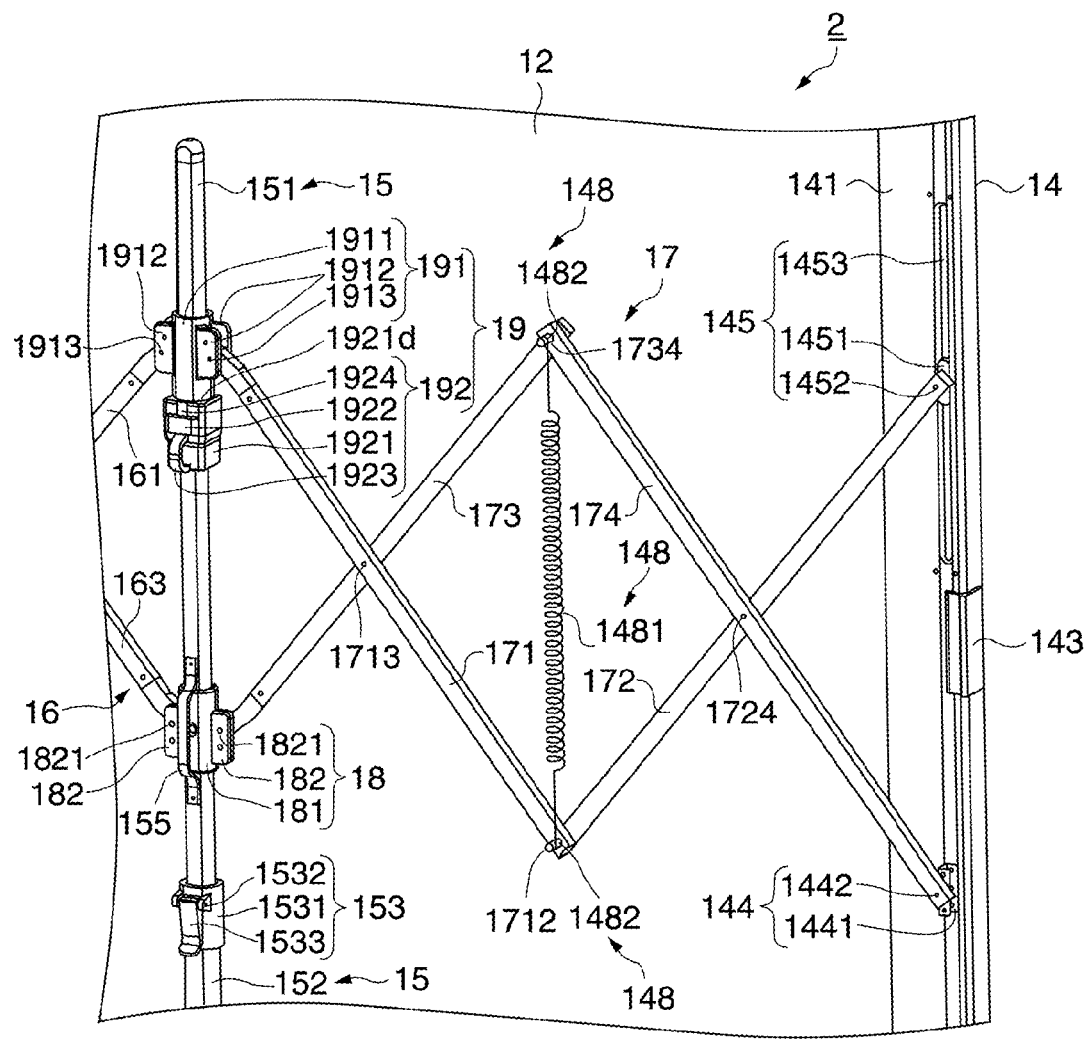
FIG. 13 is a partial enlarged drawing when viewing a principal portion of a screen according to a second embodiment from the back side.

FIG. 13 is a partial enlarged drawing when viewing a principal portion of a screen according to a second embodiment from the back side. A screen 2 in the second embodiment is different from the screen 1 in the first embodiment only in the position to install a coil spring 148 as the urging member (which corresponds to the coil spring 142 in the first embodiment), and other members are the same as the first embodiment. In FIG. 13, the same components as in the first embodiment are designated by the same reference numerals. Therefore, in the following description, only the configurations different from the first embodiment will be described.

In the screen 2 in the second embodiment, the coil spring 148 as the urging member is hooked on the pivotal shaft 1712 and the pivotal shaft 1734 which constitute the second pantograph mechanism 17 as shown in FIG. 13. The coil spring 148 is formed as a tension coil spring, and includes a spring body 1481 and hooks 1482 formed at both ends thereof. In the second embodiment, the pivotal shafts 1712 and 1734 are formed so as to project on the back side. Then, the coil spring 148 is fixed with the hooks 1482 hooked on the projected portions. The action of the coil spring 148 urges the first supporting unit 13 and the second supporting unit 14 in the direction to move away from each other.

According to the second embodiment, the same effects as in the first embodiment are achieved except for the effect relating to the urging member. As regards the urging member, the following effects are achieved.

(1) According to the screen 2 in the second embodiment, the coil spring 148 as the urging member is installed on the arm members which constitute the second pantograph mechanism 17 (specifically, the arm members 171 and 174), and hence a force that the user is required for deploying the screen body 12 may be reduced.

Third Embodiment

Figure 14:
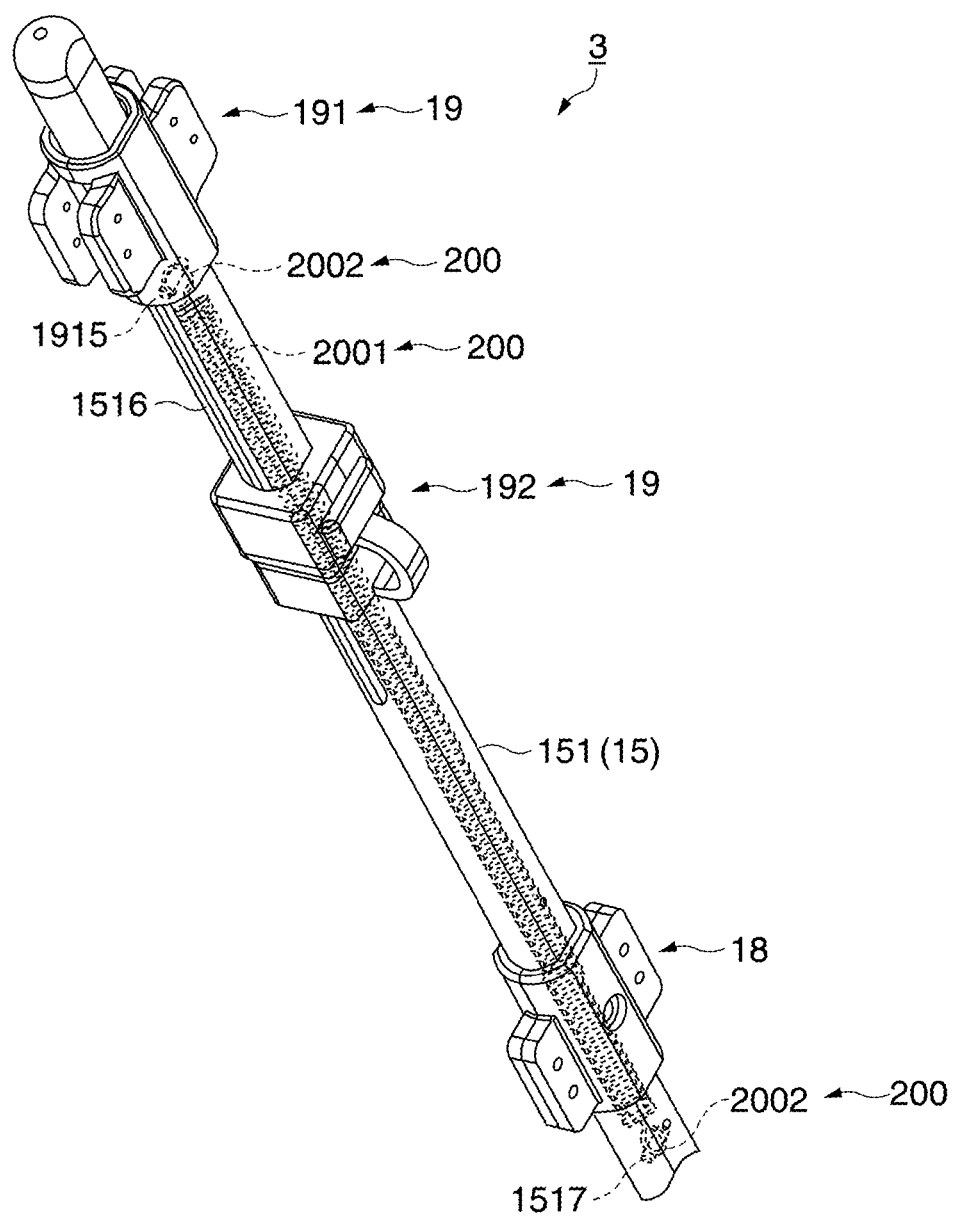
FIG. 14 is a partial enlarged drawing viewing a principal portion of a screen according to a third embodiment from the back side.

FIG. 14 is a partial enlarged drawing viewing a principal portion of a screen according to a third embodiment from the back side. A screen 3 in the third embodiment is different from the screen 1 in the first embodiment only in the position to install a coil spring 200 as the urging member (which corresponds to the coil spring 142 in the first embodiment), and other members are the same as the first embodiment. In FIG. 14, the same components as in the first embodiment are designated by the same reference numerals. Therefore, in the following description, only the configurations different from the first embodiment will be described. In FIG. 14, the fixed column 15, the arm sliding unit 19, and the arm fixing unit 18 are shown and other members such as the first pantograph mechanism 16 and the second pantograph mechanism 17 are not shown.

According to the screen 3 in the third embodiment, the coil spring 200 as the urging member is installed in the interior of the first fixed column 151 which constitutes the fixed column 15 as shown in FIG. 14. The coil spring 200 is formed as a tension coil spring, and includes a spring body 2001 and hooks 2002 formed at both ends thereof.

In the third embodiment, a sliding hole 1516 is formed along the direction of extension of the first fixed column 151 on the left side surface of the first fixed column 151. Also, a protruding portion 1915 which projects inward is formed on the left side surface of the portion 191 for causing the arms to slide along the fixed column, which constitute the arm sliding unit 19, at a position corresponding to the sliding hole 1516. Also, a protruding portion 1517 which projects inward is formed on the first fixed column 151 at a position blow the arm fixing unit 18.

The coil spring 200 is installed with one of the hooks 2002 hooked on the protruding portion 1915, and the other hook 2002 hooked on the protruding portion 1517. In this configuration, when the portion 191 for causing the arm to slide along the fixed column slides along the first fixed column 151, the protruding portion 1915 slides along the sliding hole 1516 in association with it. The action of the coil spring 200 urges the first supporting unit 13 and the second supporting unit 14 in the direction to move away from each other.

According to the third embodiment, the same effects as in the first embodiment are achieved except for the effect relating to the urging member. As regards the urging member, the following effects are achieved.

(1) According to the screen 3 in the third embodiment, the coil spring 200 as the urging member is installed in the interior of the fixed column 15, and hence a force that the user is required for deploying the screen body 12 may be reduced.

The invention is not limited to the embodiments described above, and may be implemented with various modifications or improvement applied thereto. Modifications will be described below.

First Modification

In the embodiments descried above, the first pantograph mechanism 16 and the second pantograph mechanism 17 extend in parallel to the screen body 12 at a minimum distance from the screen body 12 which is substantially the same as the fixed column 15, and are installed on the left and the right of the fixed column 15 at substantially the center. However, the invention is not limited thereto, and the first pantograph mechanism 16 and the second pantograph mechanism 17 may be installed so as to be apart from the screen body 12 by a distance different from that of the fixed column 15 in the direction parallel to the screen body 12 on the left and right sides of the fixed column 15 in order to achieve the weight balance of the image projecting portion 10. In this manner, by dividing the first pantograph mechanism 16 and the second pantograph mechanism 17, the flexibility in terms of arrangement for achieving a balance in the fore-and-aft direction of the image projecting portion 10 is improved.

Second Modification

In the embodiments described above, the projecting areas A, B, and C formed by the deployed screen body 12 by fixing the portion 192 for fixing the arm to the fixed column to the first fixing hole 1511, the second fixing hole 1512, and the third fixing hole 1513 correspond to the aspect ratios of the projected image light ("4:3", "16:10", "16:9"). However, the projecting areas are not limited to these three ratios, and may correspond to other aspect ratios of the image light. In such a case, it is achieved by forming the fixing holes corresponding to such other aspect ratios of the image light and fixing the portion 192 for fixing the arm to the fixed column.

Third Modification

In the embodiments described above, the portion 192 for fixing the arm to the fixed column is fixed to the positions for causing the aspect ratios of the projecting areas A, B, and C formed on the screen body 12 to correspond to the aspect ratios of the projected image light. However, the invention is not limited thereto and fixation may be achieved at other given positions irrespective of the aspect ratios of the projected image light.

Fourth Modification

In the first embodiment, the coil spring 142 as the urging member is installed at the second supporting unit 14. However, the invention is not limited thereto, and may be installed in the first supporting unit 13. The urging member may be installed in both of the first supporting unit 13 and the second supporting unit 14.

Fifth Modification

In the second embodiment, the coil spring 148 as the urging member is installed on the arm members of the second pantograph mechanism 17. However, the invention is not limited thereto, and may be installed on the arm members which constitute the first pantograph mechanism 16.

Sixth Modification

In the embodiments described above, the coil springs 142, 148, and 200 as the urging members are tension coil springs. However, they may be formed as the compression coil springs.

Seventh Modification

In the embodiments described above, the coil springs 142, 148, and 200 are used as the urging members. However, the invention is not limited thereto, and may be configured by resilient members other than the coil springs.

What is claimed is:

1. A screen comprising:
    a flexible screen body on which image light is projected;
    a fixed column arranged in a central portion;
    a first supporting unit and a second supporting unit arranged on the left and right of the fixed column so as to support the screen body therebetween, one of the first supporting unit and the second supporting unit including a winding member configured to wind the screen body;

a first pantograph mechanism and a second pantograph mechanism each having first and second arm members connected crisscross, the first pantograph mechanism and the second pantograph mechanism being installed respectively between the fixed column and the first supporting unit and between the fixed column and the second supporting unit so as to be expandable and contractible;

an arm fixing unit configured to pivotally support the first arm member of the first pantograph mechanism and the first arm member of the second pantograph mechanism with respect to the fixed column while supporting the same to be fixed in the vertical direction;

an arm sliding unit configured to pivotally support the second arm member of the first pantograph mechanism and the second arm member of the second pantograph mechanism with respect to the fixed column so as to be slidable in the vertical direction, the first pantograph mechanism and the second pantograph mechanism being expanded and contracted to move the first supporting unit and the second supporting unit toward and away from each other by a sliding movement of the arm sliding unit; and an urging member configured to urge the first supporting unit and the second supporting unit to move away from each other, wherein the arm sliding unit includes a portion for fixing the second arm member of the first pantograph mechanism and the second arm member of the second pantograph mechanism to the fixed column which enables fixation of the same at a predetermined position of the fixed column.

2. The screen according to claim 1, wherein the first supporting unit includes:
a fixed portion of the first supporting unit configured to pivotally support the first arm member of the first pantograph mechanism with respect to the first supporting unit while supporting the same to be fixed in the vertical direction and a sliding member of the first supporting unit configured to pivotally support the second arm member of the first pantograph mechanism with respect to the first supporting unit while allowing the same to slide in the vertical direction; and
the second supporting unit includes:
a fixed portion of the second supporting unit configured to pivotally support the first arm member of the second pantograph mechanism with respect to the second supporting unit while supporting the same to be fixed in the vertical direction and a sliding member of the second supporting unit configured to pivotally support the second arm member of the second pantograph mechanism with respect to the second supporting unit while allowing the same to slide in the vertical direction.

3. The screen according to claim 1, wherein the portion for fixing the second arm member of the first pantograph mechanism and the second arm member of the second pantograph mechanism to the fixed column fixes the arm sliding unit to a predetermined position to cause the aspect ratio of the projecting area formed on the screen body to correspond to the aspect ratio of the projected image light.

4. The screen according to claim 1, wherein the arm sliding unit includes a portion for fixing the second arm member of the first pantograph mechanism and the second arm member of the second pantograph mechanism to the fixed column separately.

5. The screen according to claim 1, wherein the urging member is installed on at least one of the first supporting unit and the second supporting unit.

6. The screen according to claim 1, wherein the urging member is installed on the fixed column.

7. The screen according to claim 1, wherein the urging member is installed on an arm member of at least one of the first pantograph mechanism and the second pantograph mechanism.

8. The screen according to claim 1, wherein the urging member is a coil spring.

9. The screen according to claim 1, wherein the fixed column and a plurality of the arm members which constitute the first pantograph mechanism and the second pantograph mechanism are formed of a hollow column-shaped member.

10. The screen according to claim 1, further comprising;
a supporting leg configured to be connected to the fixed column for supporting the screen upright and having a plurality of legs which come into abutment with a surface of installation on which the screen is installed.

11. A screen apparatus comprising:
a screen;
a fixed column arranged at a center of the screen;
a left movable column and a right movable column arranged on the left and right of the fixed column for extending the screen therebetween, one of the left movable column and the right movable column including a winding storage for the screen;
a first pantograph mechanism and a second pantograph mechanism each having first and second arm members connected crisscross, the first pantograph mechanism and the second pantograph mechanism being installed respectively between the fixed column and the left movable column and between the fixed column and the right movable column so as to be expandable and contractible in the lateral direction;
an arm fixing unit configured to pivotally support the first arm member of the first pantograph mechanism and the first arm member of the second pantograph mechanism with respect to the fixed column while supporting the same to be fixed in the vertical direction; and
an arm sliding unit configured to pivotally support the second arm member of the first pantograph mechanism and the second arm member of the second pantograph mechanism with respect to the fixed column so as to be slidable in the vertical direction, the first pantograph mechanism and the second pantograph mechanism being expanded and contracted to move the left movable column and the right movable column toward and away from each other by a sliding movement of the arm sliding unit; and
an urging member configured to urge the first pantograph mechanism and the second pantograph mechanism for expanding and contracting the first pantograph mechanism and the second pantograph mechanism in the lateral direction,
wherein:
the urging member is provided on another of the left movable column and the right movable column that is opposite from the one of the left and right movable columns including the winding storage,
the arm sliding unit includes a portion for fixing the second arm member of the first pantograph mechanism and the second arm member of the second pantograph mechanism to the fixed column which enables fixation of the same at a predetermined position of the fixed column.

* * * * *